United States Patent
Wang et al.

(10) Patent No.: US 9,681,336 B2
(45) Date of Patent: Jun. 13, 2017

(54) QUALITY OF SERVICE INFORMATION CONFIGURATION

(75) Inventors: Jun Wang, La Jolla, CA (US); Faith Ulupinar, San Diego, CA (US); Haipeng Jin, Carlsbad, CA (US); Parag Arun Agashe, San Diego, CA (US); Peerapol Tinnakornsrisuphap, San Diego, CA (US); Raymond Tah-Sheng Hsu, San Diego, CA (US); Arungundram C. Mahendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1126 days.

(21) Appl. No.: 12/136,538

(22) Filed: Jun. 10, 2008

(65) Prior Publication Data
US 2008/0310303 A1     Dec. 18, 2008

Related U.S. Application Data

(60) Provisional application No. 60/943,670, filed on Jun. 13, 2007.

(51) Int. Cl.
*H04W 28/24* (2009.01)
*H04W 76/02* (2009.01)

(52) U.S. Cl.
CPC ............ *H04W 28/24* (2013.01); *H04W 76/02* (2013.01)

(58) Field of Classification Search
CPC ......... H04W 28/0252; H04W 28/0268; H04W 28/24; H04W 28/26; H04W 72/10; H04W 72/1247; H04L 12/2465; H04L 29/06523; H04L 41/5003; H04L 67/322

USPC .......... 370/229, 230, 235, 328, 329, 395.21; 455/405–408
See application file for complete search history.

(56) References Cited

U.S. PATENT DOCUMENTS

| | | | |
|---|---|---|---|
| 7,613,171 B2 | 11/2009 | Zehavi et al. | |
| 7,818,008 B2 | 10/2010 | Kalavade | |
| 7,899,019 B1 | 3/2011 | Evans et al. | |
| 7,907,952 B2 | 3/2011 | Lee et al. | |
| 7,916,691 B2 | 3/2011 | Kopplin | |
| 8,045,515 B2 | 10/2011 | Nookala et al. | |
| 2003/0088675 A1 | 5/2003 | Zheng | |
| 2004/0255025 A1* | 12/2004 | Ricagni | 709/224 |

(Continued)

FOREIGN PATENT DOCUMENTS

| | | |
|---|---|---|
| EP | 1718006 | 11/2006 |
| EP | 1718006 A1 | 11/2006 |

(Continued)

OTHER PUBLICATIONS

3GPP TS 23.207 v6.6.0 Release 6, Sep. 2005, all pages.*

(Continued)

*Primary Examiner* — Edan Orgad
*Assistant Examiner* — Jeremy Costin
(74) *Attorney, Agent, or Firm* — James K. O'Hare

(57) ABSTRACT

Quality of service information can be used to facilitate wireless communication. A network entity, such as a terminal, as well as a network can initialize an authorization to establish a link using quality of service information. Various features can be integrated with the use of quality of service information, such as having quality of service reservation before a call and supplying a permanent identity for use in correlation.

28 Claims, 15 Drawing Sheets

(56) References Cited

U.S. PATENT DOCUMENTS

| | | | |
|---|---|---|---|
| 2006/0002422 A1* | 1/2006 | Hurtta | 370/465 |
| 2006/0025148 A1 | 2/2006 | Karaoguz et al. | |
| 2006/0153079 A1* | 7/2006 | Yoon | H04W 28/26 370/235 |
| 2006/0221828 A1* | 10/2006 | Towle | H04L 12/5695 370/230 |
| 2007/0123213 A1* | 5/2007 | Wu | 455/406 |
| 2007/0124160 A1* | 5/2007 | Duan et al. | 705/1 |
| 2007/0162289 A1* | 7/2007 | Olsson et al. | 705/1 |
| 2008/0198845 A1* | 8/2008 | Boman | 370/389 |
| 2008/0298300 A1* | 12/2008 | Mousset et al. | 370/328 |
| 2009/0190471 A1 | 7/2009 | Mahendran et al. | |

FOREIGN PATENT DOCUMENTS

| | | | |
|---|---|---|---|
| JP | 10136427 A | 5/1998 | |
| JP | 2000341343 A | 12/2000 | |
| JP | 2007097210 A | 4/2007 | |
| RU | 2006108548 | 8/2006 | |
| WO | 0230056 A2 | 4/2002 | |
| WO | WO0230056 | 4/2002 | |
| WO | 0241592 A1 | 5/2002 | |
| WO | WO0241592 | 5/2002 | |
| WO | 2004068282 A2 | 8/2004 | |
| WO | WO2004068282 | 8/2004 | |
| WO | 2005053224 A1 | 6/2005 | |
| WO | 2005112368 A1 | 11/2005 | |
| WO | WO2005112368 A1 | 11/2005 | |
| WO | 2006045497 A1 | 5/2006 | |
| WO | 2006050758 A1 | 5/2006 | |
| WO | WO2006045497 * | 5/2006 | H04L 29/06 |
| WO | 2006100125 A1 | 9/2006 | |
| WO | WO2006100125 A1 | 9/2006 | |
| WO | 2007012024 | 1/2007 | |
| WO | WO2007012024 | 1/2007 | |
| WO | 2007076881 A1 | 7/2007 | |
| WO | WO2007076881 | 7/2007 | |

OTHER PUBLICATIONS

3GPP TS 23.203 v7.2.0, 3rd Generation partnership Project; Technical Specification Group Services and System Aspects; Policy and charging control architecture, Mar. 2007, all pages.*

3GPP TS 29.212 V7.0.0 Internet Citation, [Online] Mar. 20, 2007 (Mar. 20, 2007), XP003020387 Retrieved from the Internet: URL:http://www.3gpp.org/ftp/Specs/html-info/29212.htm> [retrieved on Jan. 1, 2008].

3rd Generation Partnership Project; Technical Specification Group Services and System Aspects; End-to-end Quality of Service (QoS) concept and architecture (Release 6), 3GPP TS 23207 V6.6.0 (Sep. 2005) pp. 1-53.

"Digital cellular telecommunications system (Phase 2+); Universal Mobile Telecommunications System (UMTS); End-to-end Quality of Service (QoS) concept and architecture (3GPP TS 23.207 version 7.0.0 Release 7); ETSI TS 123 207" ETSI Standards, Lis, Sophia Antipolis Cedex, France, vol. 3-SA2, No. V7.0.0, Jun. 1, 2007 (Jun. 1, 2007), pp. 1-41, XP014037752 ISSN: 0000-0001 Par. 1 Par. 5.2.2 Par. 5.2.3a Par. 5.2.4 Par. 6.1.

International Search Report and Written Opinion—PCT/US2008/067006, International Search Authority—European Patent Office—Mar. 6, 2009.

International Search Report and Written Opinion—PCT/US09/030604—International Search Authority EPO—May 6, 2009.

Taiwan Search Report—TW097122310—TIPO—Oct. 1, 2012.

Taiwan Search Report—TW098100729—TIPO—Oct. 2, 2012.

* cited by examiner

QUALITY OF SERVICE INFORMATION CONFIGURATION

CROSS-REFERENCE

This application claims priority to U.S. Application No. 60/943,670 entitled "QoS IN UMB/CAN SYSTEMS", which was filed on Jun. 13, 2007. The entirety of which is herein incorporated by reference.

BACKGROUND

I. Field

The following description relates generally to wireless communications and, more particularly, to configuration and reservation of quality of service information.

II. Background

Wireless communication systems are widely deployed to provide various types of communication content such as, for example, voice, data, and so on. Typical wireless communication systems can be multiple-access systems capable of supporting communication with multiple users by sharing available system resources (e.g. bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and received antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region. However, conventional techniques can provide limited or no feedback related to channel information.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with a method for initiating quality of service from a network entity. The method can comprise establishing a traffic plane function with a network, as well as performing quality of service configuration with the network through use of the traffic plane function.

According to another aspect, there can be a wireless communication apparatus, comprising an institutor that establishes a traffic plane function with a network and an arranger that performs quality of service configuration with the network through use of the traffic plane function.

With a further aspect, there can be a wireless communications apparatus. The apparatus can include means for establishing a traffic plane function with a network. The apparatus can also include means for performing quality of service configuration with the network through use of the traffic plane function.

Moreover, there can be an aspect in connection with a machine-readable medium having stored thereon machine-executable instructions for establishing a traffic plane function with a network and performing quality of service configuration with the network through use of the traffic plane function.

In addition, there can be an aspect concerning a wireless communication system that includes an apparatus comprising a processor. The processor can be configured to establish a traffic plane function with a network and perform quality of service configuration with the network through use of the traffic plane function.

According to one aspect, there can be a method for initiating quality of service from a network, comprising establishing a traffic plane function through with a network entity, as well as performing quality of service configuration with the network entity through use of the traffic plane function.

A further aspect can facilitate use of a wireless communication apparatus. The apparatus can include a constituter that establishes a traffic plane function through with a network entity and a manager that performs quality of service configuration with the network entity through use of the traffic plane function.

In one aspect, there can be a wireless communications apparatus that comprises means for establishing a traffic plane function through with a network entity and means for performing quality of service configuration with the network entity through use of the traffic plane function.

Additionally, an aspect can relate to a machine-readable medium. The machine-readable medium can have stored thereon machine-executable instructions for establishing a traffic plane function through with a network entity. There can also be instructions for performing quality of service configuration with the network entity through use of the traffic plane function.

In yet another aspect, there can be a wireless communication system with an apparatus comprising a processor configured to establish a traffic plane function through with a network entity and perform quality of service configuration with the network entity through use of the traffic plane function.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
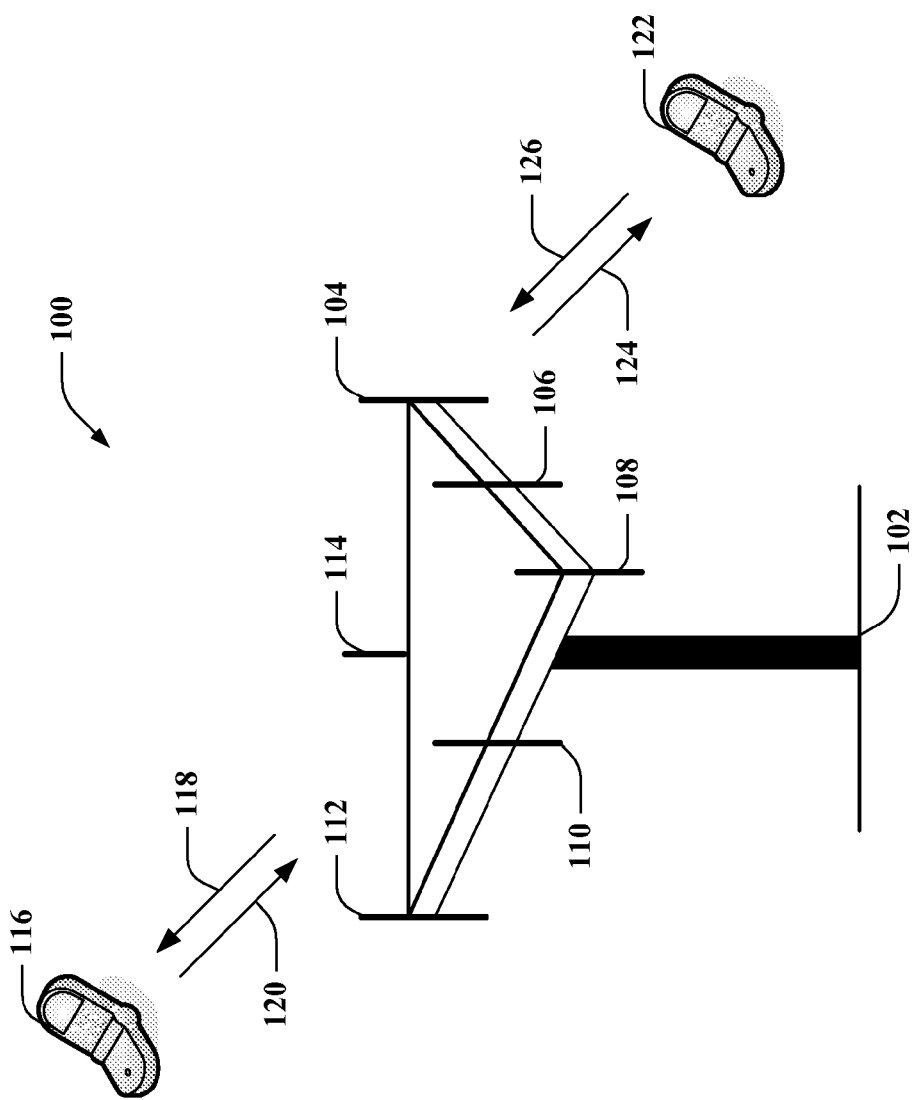
FIG. 1 is an illustration of a wireless communication system in accordance with various aspects set forth herein.

The techniques described herein can be used for various wireless communication systems such as Code Division Multiple Access (CDMA), Time division multiple access (TDMA), Frequency Division Multiple Access (FDMA), Orthogonal Frequency-Division Multiple Access (OFDMA), Single Carrier FDMA (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers Interim Standard (IS)-2000, IS-95 and IS-856 standards. A TDMA system can implement a radio technology such as Global System for Mobile Communications (GSM). An OFDMA system can implement a radio technology such as Evolved Universal Terrestrial Radio Access (Evolved UTRA or E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDM®, etc. Universal Terrestrial Radio Access (UTRA) and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Various embodiments are now described with reference to the drawings, wherein like reference numerals are used to refer to like elements throughout. In the following description, for purposes of explanation, numerous specific details are set forth in order to provide a thorough understanding of one or more embodiments. It can be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

The set of antennas and/or the area in which they are designated to communicate can be referred to as a sector of base station 102. For example, multiple antennas can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Figure 2:
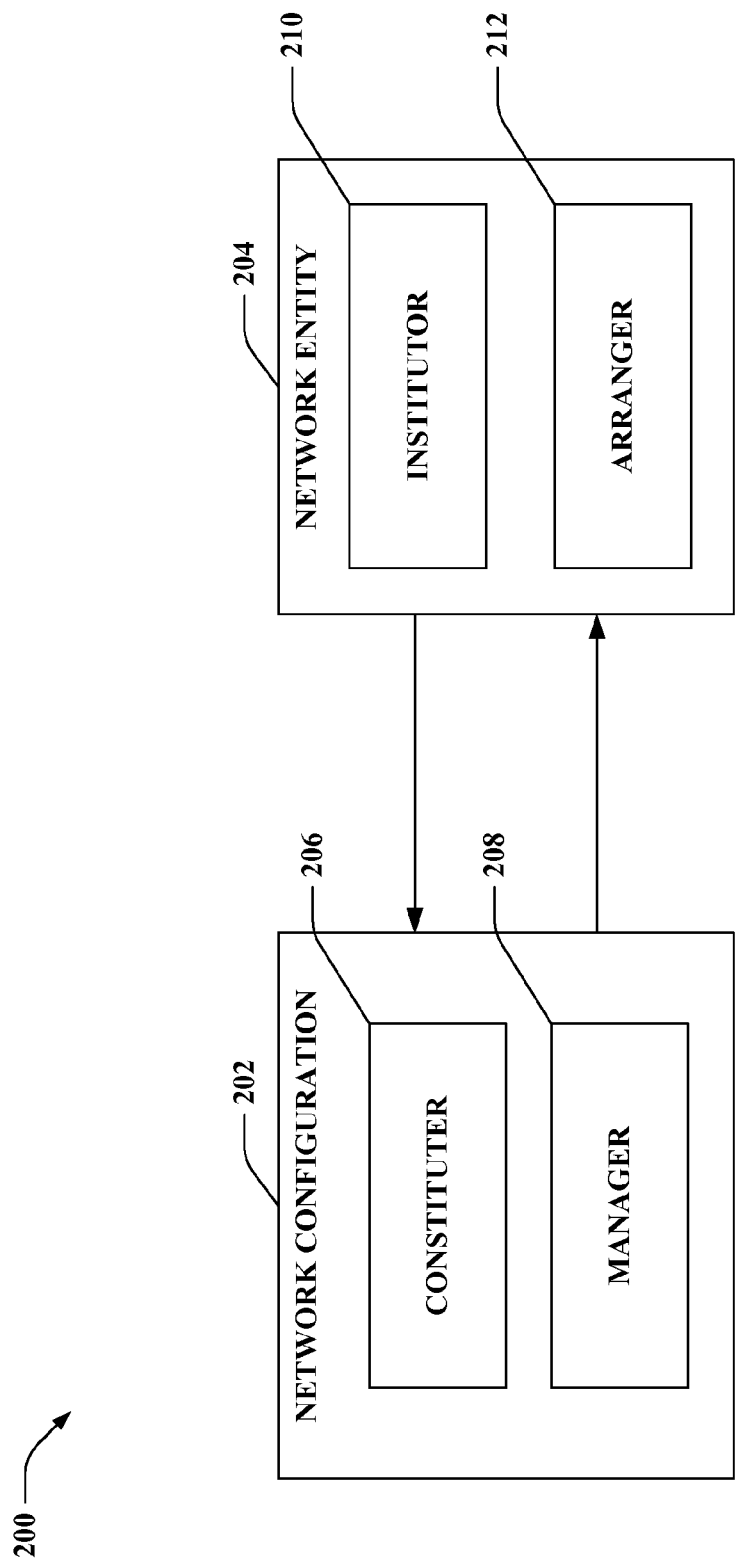
FIG. 2 is an illustration of a representative system for communication using quality of service information in accordance with various aspects set forth herein.

Now referring to FIG. 2, an example system 200 is disclosed for configuring quality of service (QoS) used in data communication. Use of QoS information allows for resources of communication entitles to be reserved—specifically, resources can be allocated for cellular communications. A specific network entity can initiate configuration of QoS information, such as a mobile device 1116 of FIG. 1 or a base station 102 of FIG. 1. However, a network can also configure QoS information with regard to a network entity (e.g. such as an access terminal).

A network configuration 202 can organize QoS information in relation to interaction with a network entity 204. A constituter 206 can establishes a traffic plane function with the network entity 204. The traffic plane function can be a representation of an access gateway that can aggregate usage information and report a result of the aggregation to a usage function. A manager 208 can performs QoS configuration with the network entity 204 through use of the traffic plane function. There can be a policy decision entity (e.g., retained in the constituter 206, manager 208, a separate entity, etc.) used by the network configuration 202 that can provide dynamic policies related to QoS and charging to an access gateway such that the access gateway can set up Internet Protocol and access network resources toward a network entity related to these policy decisions. In addition, the network configuration 202 can also include static configuration entities (e.g., retained in the constituter 206, manager 208, a separate entity, etc.) that can provide static policy or configuration information related to QoS and charging to the network entity 204.

Conversely, the network entity 204 can configure the QoS information or obtain authorization of QoS information with the network configuration 202. An institutor 210 can be used that establishes a traffic plane function with a network (e.g., the network configuration 202). An arranger 212 can perform quality of service configuration with the network through use of the traffic plane function. The network entity (e.g., access terminal) can initiate QoS setup toward an access gateway, which can send the information to a policy decision entity within the network configuration 202 for authorization. The policy decision entity can provide an authorization decision back to the access gateway and also provide policy enforcement rules related to the authorization.

In both a network entity initiated and network configuration initiated situation, a efficient QoS architecture (e.g., having packet filter established in access network and use Differentiated Services Code Point (DSCP) marking to provide QoS in backhaul) can be provided. In addition, there can be addition of a new QoS attribute of Inter-User Priority (e.g., user class) from home authentication, authorization, and accounting (HAAA) to access network for admission control and QoS treatment. Moreover, there can be at least one added mechanism on how access network marks DSCP on reverse link and how access gateway marks DSCP on forward link. Additionally, there can be Service Based Bearer Control (SBBC) Support provided towards access network (e.g., how and what SBBC parameters are sent to access network, and the like). The support can be used to solve problems on how network entity 204 initiated (e.g., access terminal initiated) QoS and network configuration 202 initiated QoS works together with SBBC/policy and changing control (PCC).

Additionally, other functionality can be used in relation to QoS information. A token can be used to match reservation at network entities such as Evolved Node B (eNB) with actually received rules (e.g., token goes from the network entity 204 to application functions and policy decision functions). This can operate as an alternative for packet filter matching. Additionally, Interoperability Specification (IOS) signaling can be used to carry policy information instead of Diameter or Radius. There can also be multiple Internet Protocol (IP) addressed associated with one policy session between an access gateway and the policy decision entity. Within the access network, reservation identifications are used to identify QoS reserved for certain applications. A split can occur of reservation identification space into two: one for network entity initiated and one for network configuration initiated. Information can be provisioned to the network entity 204 so that it can be known whether network entity initiated and/or network configuration initiated QoS is used for each application.

Figure 3:
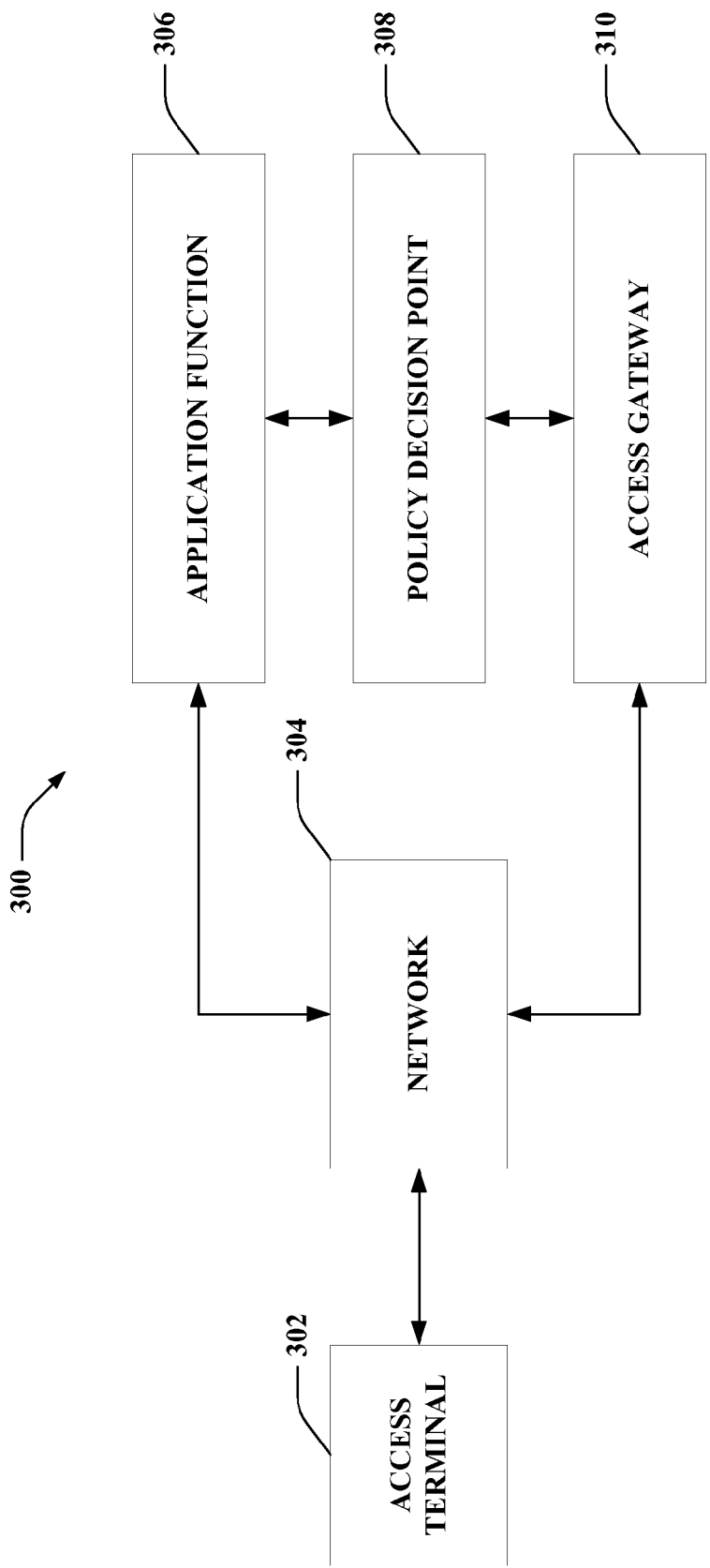
FIG. 3 is an illustration of a representative system for initiating quality of service information communication in accordance with various aspects set forth herein.

Now referring to FIG. 3, an example system 300 is disclosed for initiating QoS communication from a network and/or a network entity. A access terminal 302 (e.g., an example network entity) can communicate with an application function 306 by way of a network 304 and an access gateway 310. The network can be in communication with an application function 306, a policy decision point 308, and an access gateway 310.

According to a push mode, the access terminal 302 can communicate with the application function 306 by way of the network 304 and the access gateway 310. The application function 306 can authorize QoS and transfer the QoS to the policy decision point 308 to for service based authorization. The policy decision point 308 can communicate policy decisions to the access gateway 310. If necessary, additional bearer control can be performed among the access terminal 302, the network 304, and the access gateway 310. The access gateway 310 can compare the authorized QoS against an IP level requested of QoS. A result of the comparison can be used to facilitate QoS communication. The access gateway can provide policy decisions received from the policy decision point 308 to the network 304 for enforcement. There can be multiple entities in the network 304 involved in the communication with the access terminal 302. A synchronization mechanism can be used to update the policy and enforcement information on the multiple entities within the network 304. This synchronization mechanism can also involve interaction with the access terminal 302. It is to be appreciated that the system 300 can work without the network 304, such that direct communication is achieved from the access terminal 302 (e.g., in a access terminal initiated configuration).

In another embodiment, the access terminal 302 (or network 304 in a network initiated instance) can exchange information with the application function 306. The application function 306 can authorize QoS parameters and transfer the parameters to the policy decision point 308 where there can be local IP authorized QoS parameters (e.g., where the policy decision point 308.collects a governing policy). Information can be bound between the access terminal 302 and the access gateway 310 as well as between the access gateway 310 and the policy decision point 308. Local IP authorized QoS parameters can become IP level authorized QoS parameters of the access gateway 310. The access gateway 310 can compare the authorized QoS against an IP level requested of QoS. A result of the comparison can be used to facilitate QoS communication.

According to one embodiment, a token can be communicated between the access terminal 302 and application function 306 and the application function passes the token to the policy decision point 308. The policy decision point 308 can then pass the token to the access gateway 310 and network 304 with QoS rule. The access terminal 302 can then pass the same token to the network 304 when requesting QoS. As a result, the network 304 can know that the access terminal 302 is requesting something related to what the application function 306 has indicated. IOS can be between the network 304 and the access gateway 310 or between multiple network entities within the network 304. A reservation identifier space can be used between the access terminal 302 and network 304 (e.g., access network) and can be divided into two spaces: one for access terminal-initiated QoS and one for network-initiated QoS.

The access terminal 302 (e.g., mobile device) and application function 306 can negotiate application related information. The application function 306 can pass the service information to the policy decision point 308 for authorization. The policy decision point can authorize a service and derives policy rules based on the authorized service information. The policy decision point 308 can pass the policy rules to the access gateway 310 which can redistribute the rules to the network 304. The access gateway 310 or the network can initiate QoS setup based on the received rules.

In an embodiment of a pull mode, The access terminal 302 can setup based QoS with the network 304 based on some preconfigured information or an application that access terminal 302 is planning to start. Setup can trigger the access gateway 302 to request authorization from the policy decision point 308. Once the QoS is available or in parallel to QoS setup, the access terminal 302 and application function 306 can negotiate application information. The application function can pass service information to the policy decision point 308 for authorization. The policy decision point 308 can authorize the service and derive the related policy rules. Since the access gateway 310 can previously request QoS for this service, the policy decision point 308 can correlate rules to a previous authorization and sends an update to the access gateway 310. The access gateway can provide policy decisions received from the policy decision point 308 to the network 304 for enforcement. There can be multiple entities in the network 304 involved in the communication with the access terminal 302. A synchronization mechanism is used to update the policy and enforcement information on the multiple entities within the network 304. This synchronization mechanism can also involve interaction with the access terminal 302. Aspects disclosed in FIG. 3 can be applied to other aspects disclosed herein (e.g., the network configuration 202 of FIG. 2 and/or the network entity 204 of FIG. 2).

Figure 4:
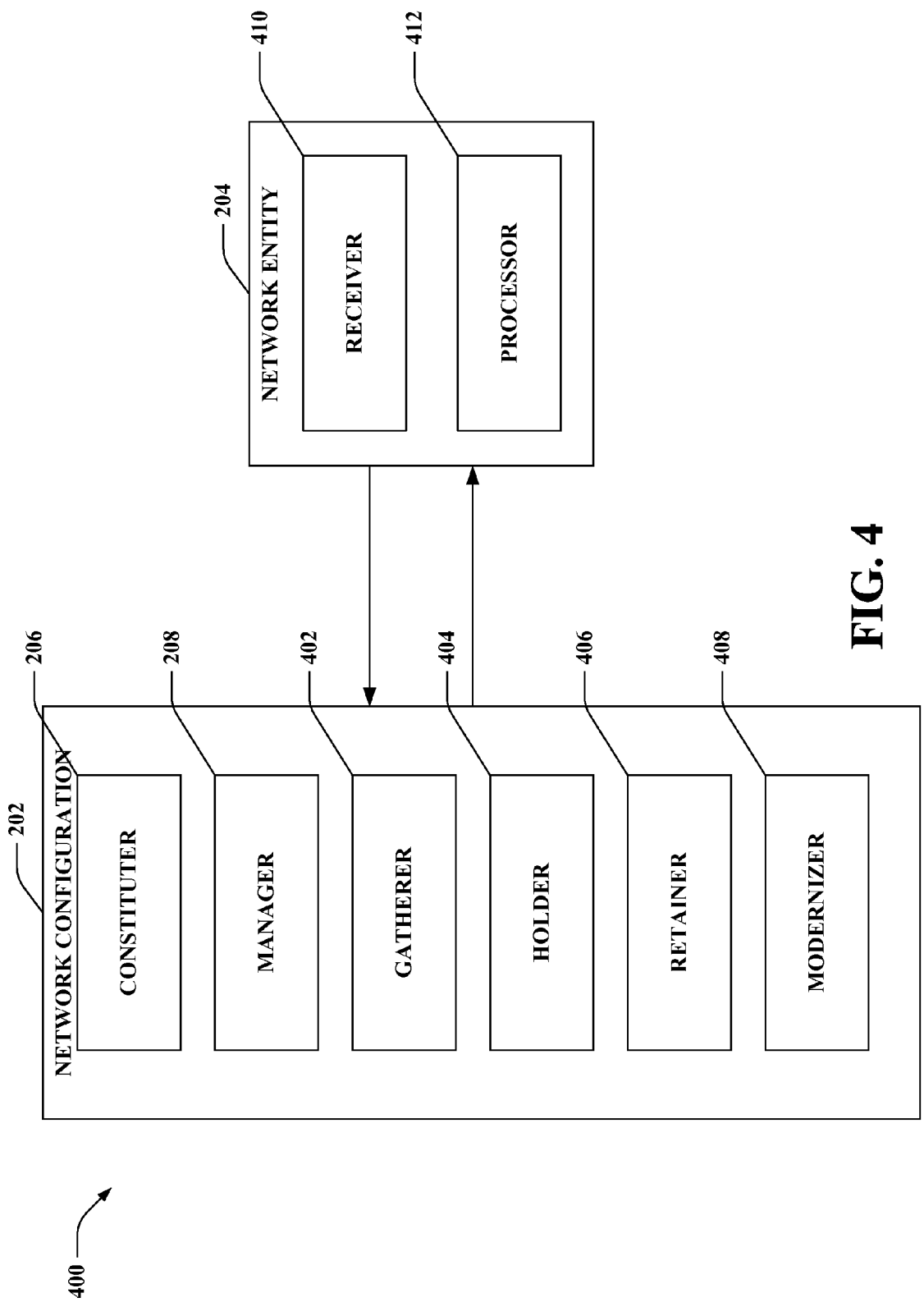
FIG. 4 is an illustration of a representative system for communication using quality of service information with a detailed network configuration in accordance with various aspects set forth herein.

Now referring to FIG. 4, an example system 400 is disclosed for configuring quality of service used in data communication through use of a detailed network configuration 202. Thus, the system 400 can represent a network configuration 202 initiated situation. A constituter 206 can be used that establishes a traffic plane function through with a network entity. Moreover, a manager 208 can perform QoS configuration with the network entity 204 through use of the traffic plane function.

Various other modules can be used to facilitate functionality and improve QoS operation. The network configuration can use a gatherer 402 that collects QoS information from an access gateway, where the access gateway can obtain the QoS information from a policy changing rules function. This can be done prior to configuring a call, which is not thought to be allowable.

Additionally, a holder 404 can be used that reserves QoS information prior to initiation of a communication link, the reserved quality of service information is configured. It is conventionally thought that QoS information cannot be configured prior to a link being established. However, policies can be configured and exchanged between different network entities (e.g., the network entity 204), the network configuration 202, and the like that can allow for information to be shared and QoS information to be used at call-time.

According to one embodiment, an amount of QoS information can be reserved prior to establishing a call. A retainer 406 can be used that reserves a section of QoS information, oftentimes before establishing the call. The network entity 204 can use a portion of the section of QoS information that is reserved. The network configuration 202 can then free QoS information that is not used by the network entity 204. Commonly, the retainer 406 reserves a section larger than what can be used by the network entity 204. This can be considered a guarantee such that a call can start since enough QoS information is reserved for the network entity 204 can this can allow for faster calls since QoS information is readily available Since the network configuration 202 can have different policies then at least one network entity 204, different outputs can take place from similar requests. Therefore, a modernizer 408 can be implemented that uses update procedure to synchronize at least one policy between the network entity and the network—thus similar outputs can be produced from a common command. The network entity 204 can use a receiver 410 to engage in communication and a processor 412 to facilitate operation. Use of the system 400 can lead to use of partial session information based policy authorization for improved (e.g., optimized) call flow.

Figure 5:
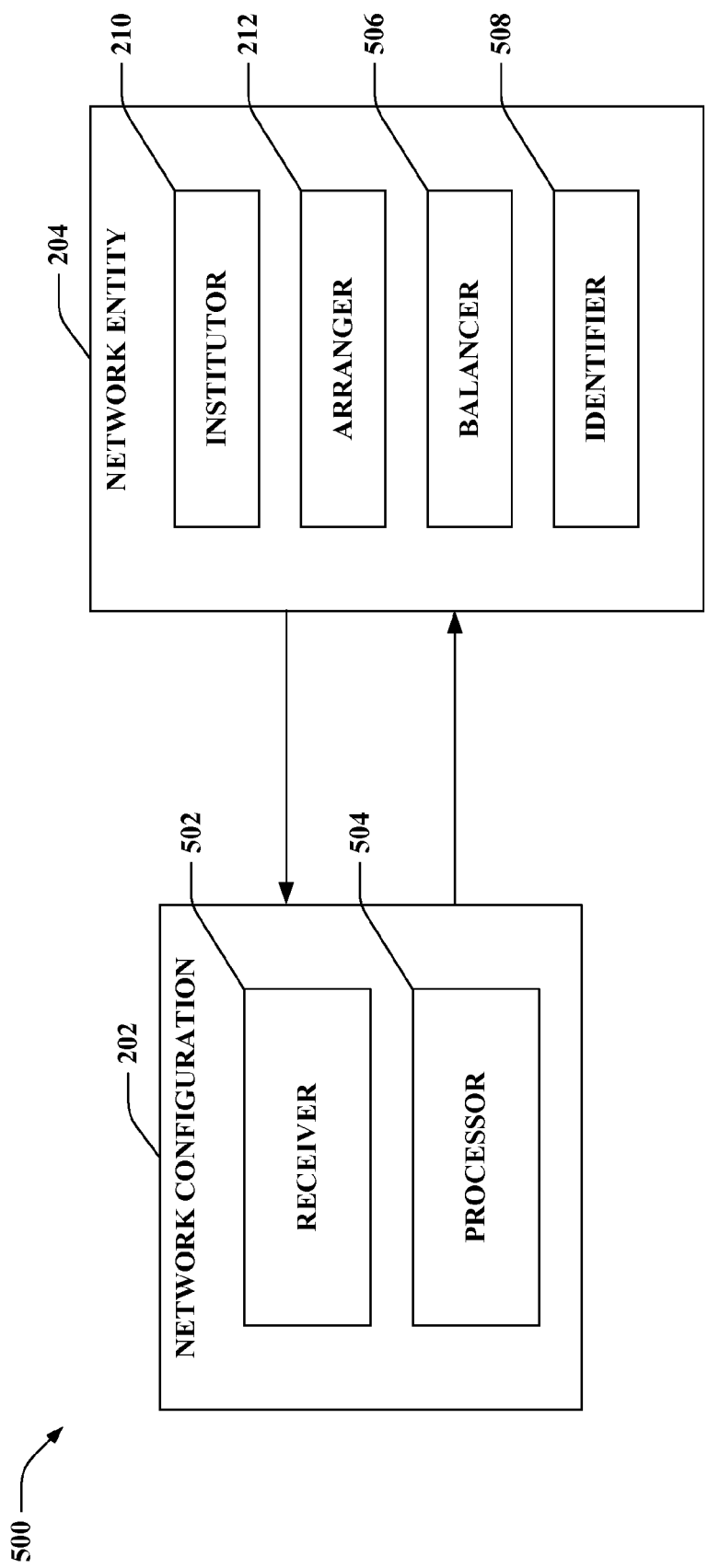
FIG. 5 is an illustration of a representative system for communication using quality of service information with a detailed network entity in accordance with various aspects set forth herein.

By using a QoS configuration as disclosed herein, several elements of functionality can be practiced. There can be pre-authorization from a policy decision point to allow QoS reservation before call setup (e.g., QoS portions reserved before implementing setup procedures of a call). Additionally, there can be policy synchronization among network entities through context update procedures (e.g., push full set of rules every time from access gateway to network to avoid racing condition). Additionally, there can be using subscription based policy authorization together with policy update and late binding to allow improved call flow Now referring to FIG. 5, an example system 500 is disclosed for configuring quality of service used in data communication through use of a detailed network entity 204. The network entity 204 can supply information to the network configuration 202 to facilitate use of QoS information. A receiver 502 can be used by the network entity to engage in communication and a processor 504 can be used to appreciated and/or data.

The network entity 204 can use an institutor 210 that establishes a traffic plane function with a network (e.g., the network configuration 204). An arranger 212 can performs QoS configuration with the network through use of the traffic plane function. Different functionality can enable various features to be used with regard to QoS information usage. According to one embodiment, configuring the traffic plane function is done through use of subscription policy, policy update, and late binding. A balancer 506 can reserve QoS information prior to initiation of a communication link; the reserved QoS information is oftentimes configured by the arranger 212.

Similarly with what was described in a network entity initiated implementation (e.g., what is shown in FIG. 4), different policies can lead to varying results which can be undesirable. A balancer 506 can combat the undesirable impact by using update procedure to synchronize at least one policy between the network entity and the network. In conventional communication systems, temporary identification can be provided to entities. However, there can be correction problems if the same temporary identification is not available at all involved entities. An identifier 508 can be used that supplies a permanent identity of the network entity to the network. Thus there can be supplying of a permanent Network Address Identifier (NAI) from HAAA (e.g., an HAAA server) to an access gateway for the access gateway to use in communication with policy decision point, which also received the same permanent identification from the HAAA, for correlation.

Figure 6:
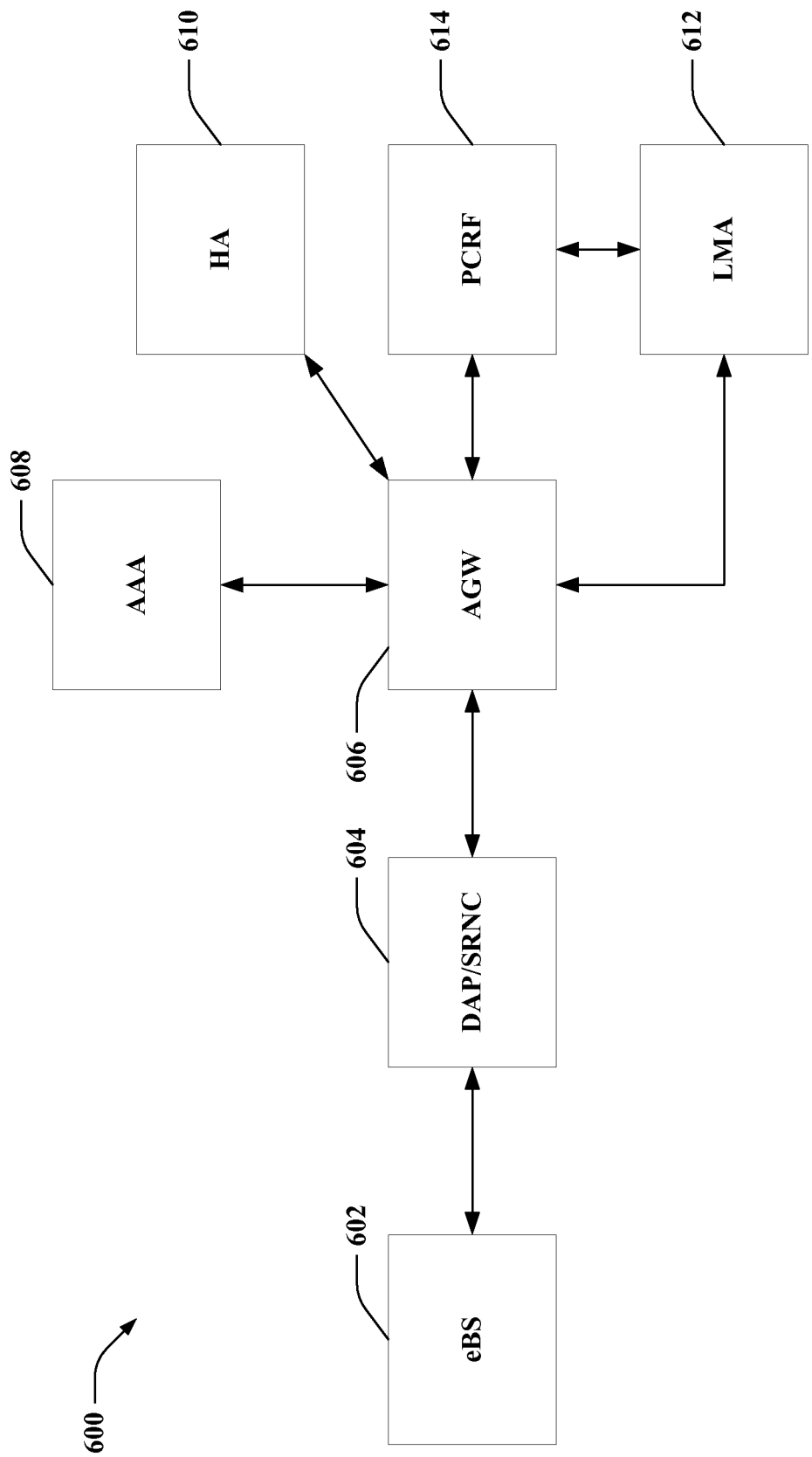
FIG. 6 is an illustration of a representative system for communication using quality of service information with a detailed network entity in accordance with various aspects set forth herein.

Now referring to FIG. 6, an example system 500 is disclosed for communicating information as part of a network, such as through Ultra Mobile Broadband (UMB) radio-access technology. An eBS 602 (evolved base station, such as the base station 102 of FIG. 1) can engage with a DAP (Data Achievement Point) and/or a SRNC (Signal Radio Network Controller) 604 that maintains session reference. The DAP and/or SRNC 604 can communicate with an AGW 606 (access gateway, such as the access gateway 310 of FIG. 3). Through the AGW 606, a number of entities can communicate with the eBS 602 with the AGW 606 providing a user point of Internet Protocol conductivity to a network. The AGW 606 can engage with an AAA 608 (Authentication, Authorization, and Accounting Function) that can provide authentication, authorization, and accounting functions with respect to an access terminal use of network resources. Additionally, the AGW 606 can communicate with a HA 610 (home agent) that provides mobility functionality. A LMA 612 (Local Mobility Anchor) can be interfaces with the AGW 606 directly or through communication with a PCRF 614 (Policy and Changing Rules Function) that provides a standard in which the AGW 606 can operate. The LMA 612 can function as an anchor point for a mobile terminal and manages a mobile terminal's reachability state.

Referring to FIGS. 7-10, methodologies relating to a QoS information communication are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

Figure 7:
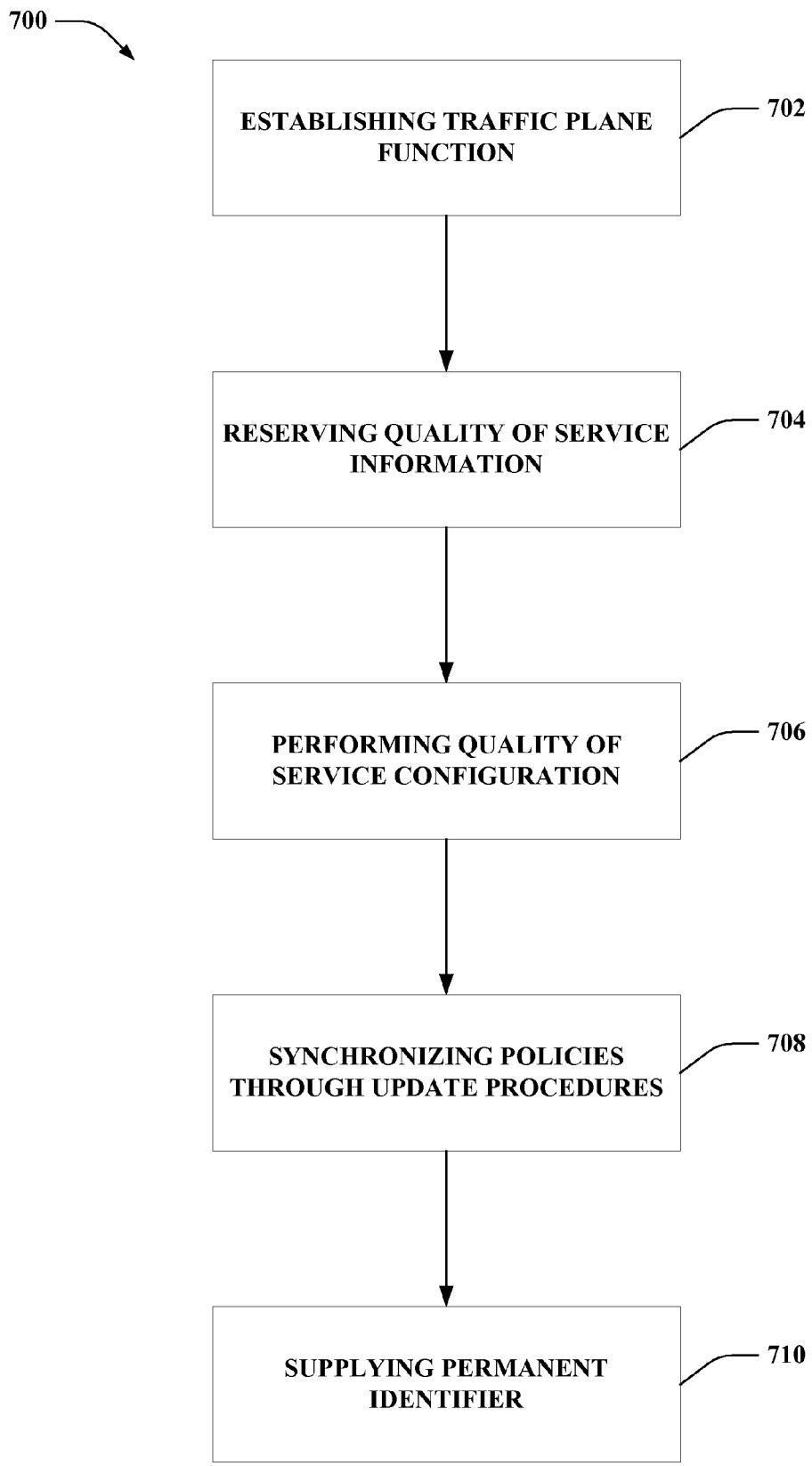
FIG. 7 is an illustration of a representative network configuration in accordance with various aspects set forth herein

Now referring to FIG. 7, an example methodology 700 is disclosed for using QoS information in a network entity initiated setting. At event 702, there can be establishing a traffic plane function with a network. QoS information can be reserved prior to initiation of a communication link at event 704, which can be facilitated from pre-authorization of policy.

With an established traffic plane function, there can be performing QoS configuration with the network through use of the traffic plane function through act 706. Thus, the reserved QoS information is configured (e.g., that was reserved through act 706). At block 708 there can be using update procedure to synchronize at least one policy between the network entity and the network. According to one embodiment, configuring the traffic plane function is done through use of subscription policy, policy update, and late binding. There can also be supplying a permanent identity of the network entity to the network performed through action 710, the action 710 can occur when the traffic plane function is established at event 702 or before.

Figure 8:
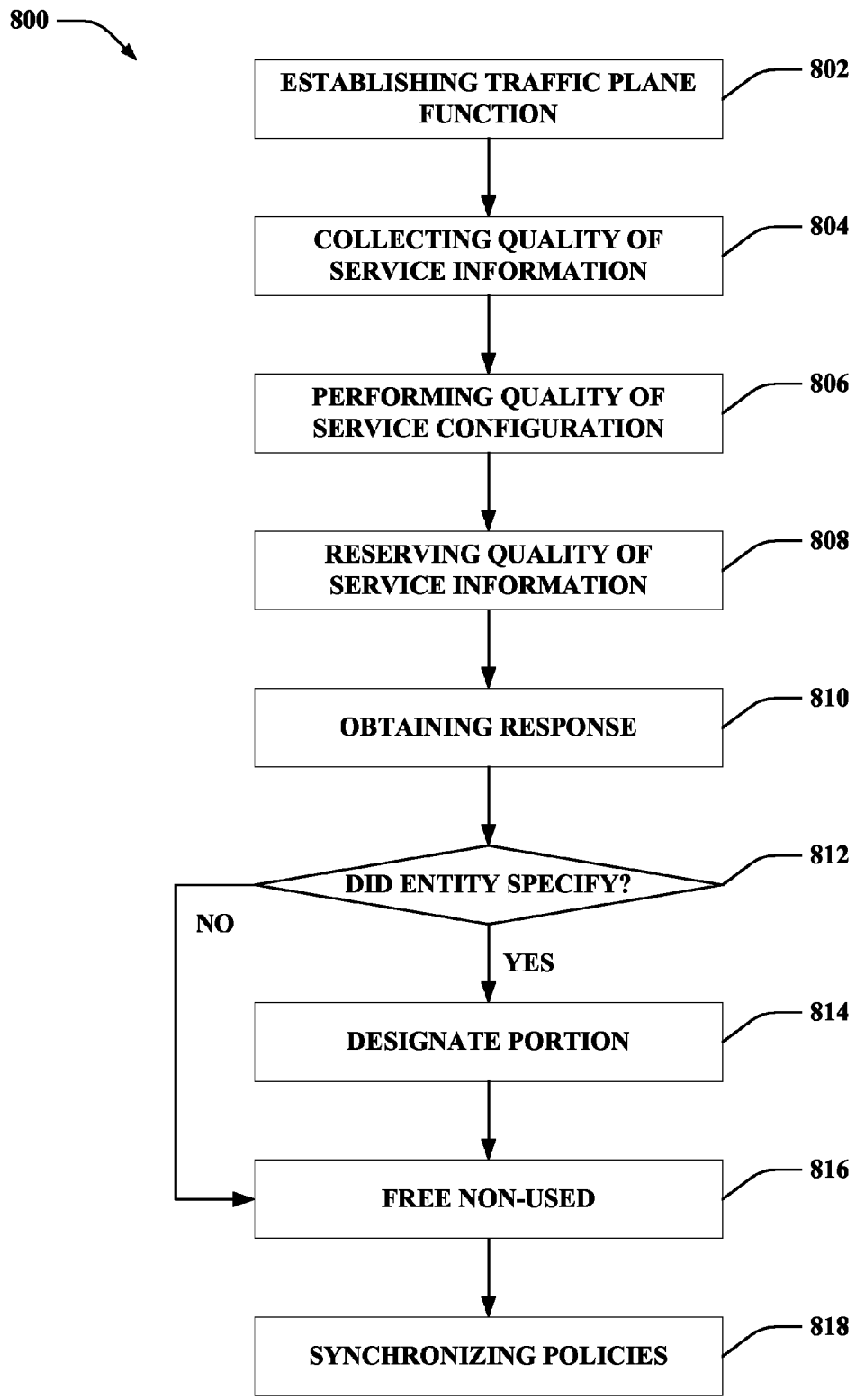
FIG. 8 is an illustration of a representative methodology for wireless communication using quality of service information in accordance with various aspects set forth herein

Now referring to FIG. 8, an example methodology 800 is disclosed for using QoS information in a network entity initiated setting. At action 802, there can be establishing a traffic plane function through with a network entity. With a collected traffic plane, collecting quality of service information from an access gateway can occur at act 804. According to one embodiment, the access gateway obtains the quality of service information from a policy changing rules function. There can also be performing QoS configuration with the network entity through use of the traffic plane function at event 806. Additionally, QoS information can be reserved prior to initiation of a communication link, where the reserved QoS information is configured.

A section of QoS information can be reserved at action 808. A request can then be sent out to an entity, where the entity can provide a response. The entity can provide a response that is collected at action 810 and a check 812 can take place to determine if the entity specified a QoS information portion. Commonly, the entity desires to use a portion of the reserved QoS and notifies a network of the desire, so the portion can be designated at event 814. It is also possible that more QoS is required than the reserved QoS, the methodology 800 can be used to update the reserved QoS based on the actual request. However, it is possible that no designation is made by the entity, so the network can determine how much QoS information that is reserved to use. The determination can be made through use of artificial intelligence techniques.

Artificial intelligence techniques can employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g. created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. In addition, these techniques can also include methods for capture of logical relationships such as theorem provers or more heuristic rule-based expert systems. The artificial intelligence techniques can be used to perform determinations disclosed herein. Based upon the specified portion used of the reserved section (e.g., requested by an entity, determined, and the like), a remainder can be freed at action 816. Alternatively, if the required QoS can be more than the reserved section, additional resources can be provisioned at action 816. At event 818, update procedure can be used to synchronize at least one policy between the network entity and the network.

Figure 9:
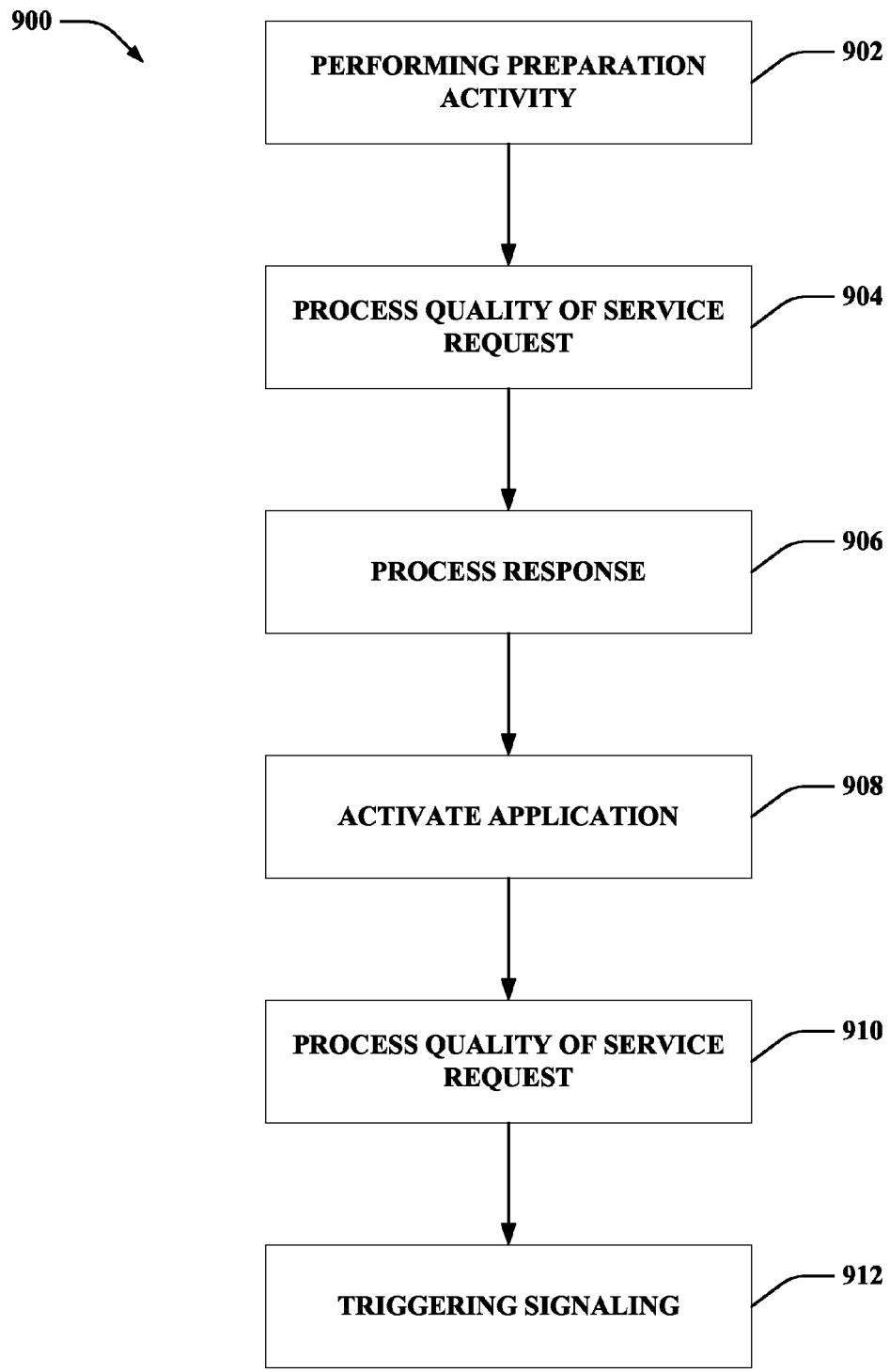
FIG. 9 is an illustration of a representative methodology for processing multiple protocol data units in accordance with various aspects set forth herein.

Now referring to FIG. 9, an example methodology 900 is disclosed for a network entity initiated QoS implementation. Preparation activities in relation to quality of service information can be performed at event 902. Initially, there can be performing of access authentication and authorization. With proper authentication and/or authorization, an application can start.

At block 904, there can be processing of a request to use QoS information in relation to the application. Application sends QoS request to a network entity, where the network entity can forward the request throughout the network. The network can authorize the QoS request, make modification to the request, make suggestion related to the request, and the like.

A response can be gathered at action 906 that relates to the request of use of QoS information. In addition to sending the QoS response, the network can transfer configuration data, which can be specific to the network, suggestion for the network entity, and the like. The network entity can process the response and configuration data and forward information to the application. The application can reside upon the network entity, upon another location, and the like.

With a proper response, the application can be activated through event 908. Additionally, there can be an ON request that is used in configuration related to QoS information through act 910. The application can end an ON request to an access terminal, where the access terminal sends a reservation ON request to an access network that the network can then accept. The access terminal can then send a QoS ON to the application. Signaling triggering can occur through event 912. Application triggers Session Initiation Protocol (SIP) or non-SIP to an application server. If it is determined that signaling is complete, then data can flow.

Figure 10:
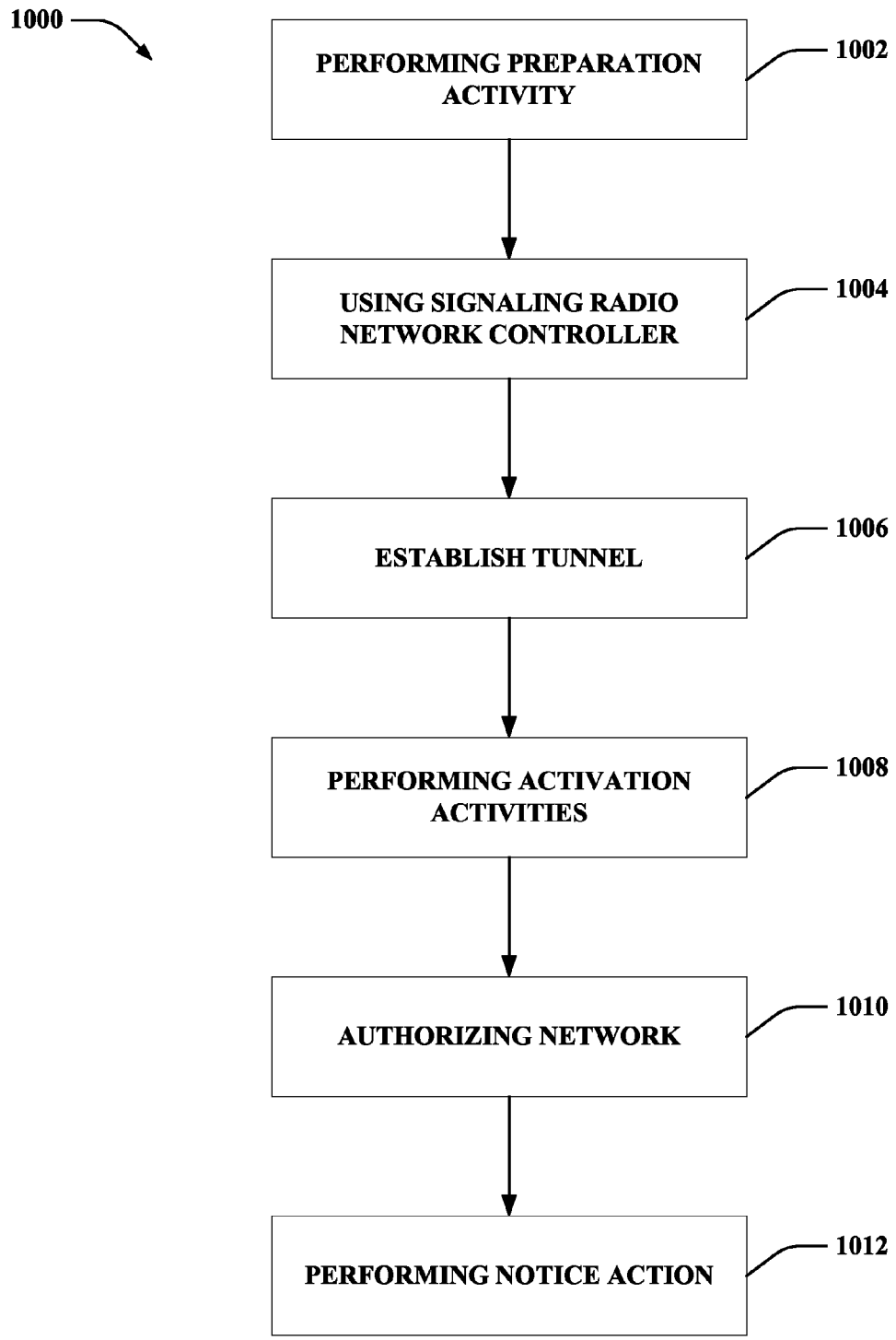
FIG. 10 is an illustration of a representative methodology for transferring a protocol data unit in accordance with various aspects set forth herein.

Now referring to FIG. 10, an example methodology 1000 is disclosed for a network initiated QoS setup. There can be performing preparation activities at event 1002 This can include when the access terminal (AT) performs successful access authentication and authorization. Also, there can be Authentication and Authorization procedures and a QoS User Profile can be sent to a signaling radio network controller (SRNC). The SRNC sends QoS User Profile to eBS as session information, represented by action 1004. The tunnel between DAP and AGW can be established at action 1006. The IP address can also assigned. Since SBBC is supported, the AGW establishes the path with vPCRF and hPCRF. The static policy can be sent from the vPCRF and hPCRF to the AGW and the AGW sends it to the SRNC.

Initial activation activities can occur through block 1008. The application can be activated. The application can also sends App Activated to the AT. The application can trigger SIP or Non SIP signaling to the Application Server. Triggered by application signaling, the App Server sends SBBC push to the vPCRF/hPCRF, where the vPCRF/hPCRF sends SBBC push to the AGW containing the session QoS. Additionally, the AGW can send SBBC push to the AN/DAP.

Network authorization can take place at event 1010. The AN can authorize the QoS based on QoS User Profile. The AN can send a configuration request to the AT containing ReservationKKQoS request and TFT. The AT cam send a configuration response to the AN. The AN can also send Reservation ON Request to the AT including the granted QoS. The AT can also send ForReservationAck and/or RevReservationAccept to the AN and AT sends QoS ON to the Application. Notice actions can take place at act 1012, such that the DAP notify the SRNC on the session QoS, which can be performed in parallel with the AN authorizing the QoS based on QoS User Profile. The DAP sends session reconfigured to the AT. Also, the AT can notify all active set members to get new session from SRNC.

It will be appreciated that, in accordance with one or more aspects described herein, inferences can be made regarding whether QoS communication should be employed, determining a wakeup period parameter, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to using QoS information in a network setting. By way of further illustration, an inference can be made related to selecting a number of physical frames as a wakeup period parameter based upon intended application, desired power savings, etc. It will be appreciated that the foregoing examples are illustrative in nature and are not intended to limit the number of inferences that can be made or the manner in which such inferences are made in conjunction with the various embodiments and/or methods described herein.

Figure 11:
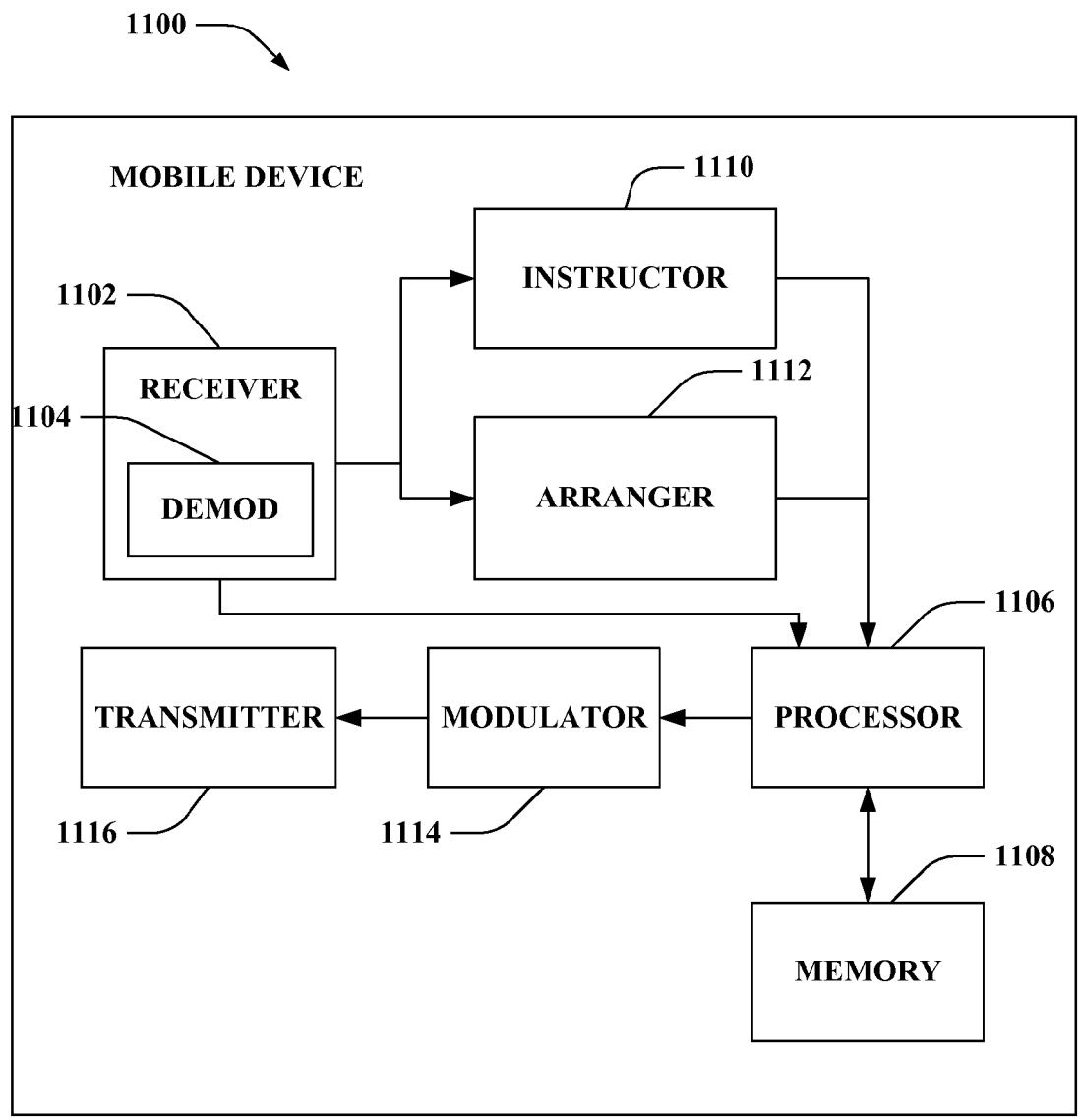
FIG. 11 is an illustration of an example mobile device that facilitates use of quality of service information in accordance with various aspects set forth herein.

FIG. 11 is an illustration of a mobile device 1100 that facilitates use of QoS information, where the mobile device 1100 can operate as a network entity (e.g., access terminal). Mobile device 1100 comprises a receiver 1102 that receives a signal from, for instance, a receive antenna (not shown), and performs typical actions thereon (e.g., filters, amplifies, downconverts, etc.) the received signal and digitizes the conditioned signal to obtain samples. Receiver 1102 can be, for example, an MMSE receiver, and can comprise a demodulator 1104 that can demodulate received symbols and provide them to a processor 1106 for channel estimation. Processor 1106 can be a processor dedicated to analyzing information received by receiver 1102 and/or generating information for transmission by a transmitter 1116, a processor that controls one or more components of mobile device 1100, and/or a processor that both analyzes information received by receiver 1102, generates information for transmission by transmitter 1116, and controls one or more components of mobile device 1100.

Mobile device 1100 can additionally comprise memory 1108 that is operatively coupled to processor 1106 and that can store data to be transmitted, received data, information related to available channels, data associated with analyzed signal and/or interference strength, information related to an assigned channel, power, rate, or the like, and any other suitable information for estimating a channel and communicating via the channel. Memory 1108 can additionally store protocols and/or algorithms associated with estimating and/or utilizing a channel (e.g., performance based, capacity based, etc.).

It will be appreciated that the data store (e.g., memory 1108) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and methods is intended to comprise, without being limited to, these and any other suitable types of memory.

Processor 1102 cab be further operatively coupled an institutor 1110 and/or an arranger 1112. The institutor 1110 can establish a traffic plane function with a network and an arranger 1112 can perform QoS configuration with the network through use of the traffic plane function. Mobile device 1100 still further comprises a modulator 1114 and the transmitter 1116 that transmits a signal (e.g., base CQI and differential CQI) to, for instance, a base station, another mobile device, etc. Although depicted as being separate from the processor 1106, it is to be appreciated that institutor 1110 and/or arranger 1112 can be part of processor 1106 or a number of processors (not shown).

Figure 12:
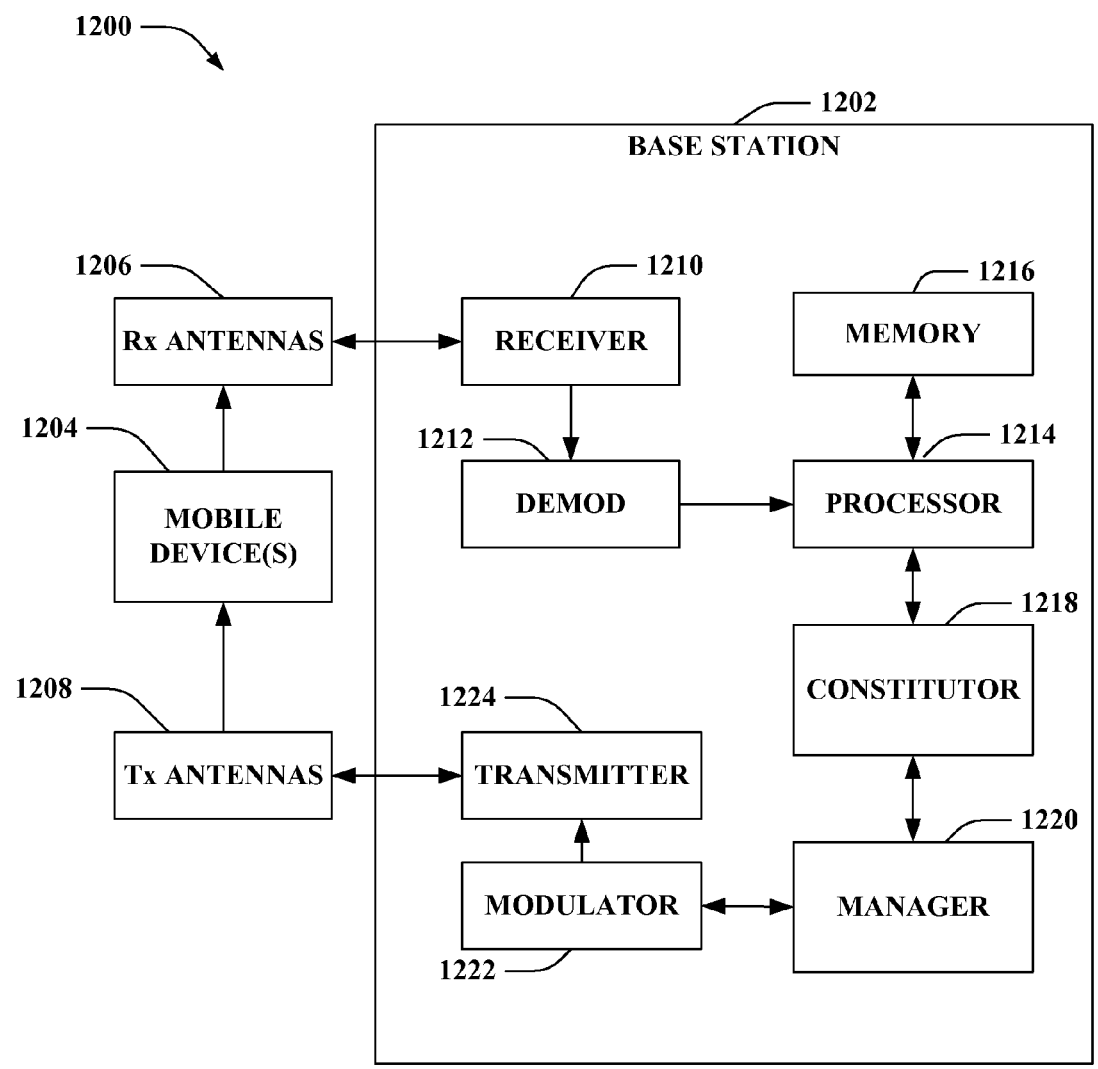
FIG. 12 is an illustration of an example system that facilitates use of quality of service information that is network entity initiated in accordance with various aspects set forth herein.

FIG. 12 is an illustration of a system 1200 that facilitates communication QoS information initiated by a network, where the system 1200 can represent an network configuration. System 1200 comprises a base station 1202 (e.g., access point, . . . ) with a receiver 1210 that receives signal(s) from one or more mobile devices 1204 through a plurality of receive antennas 1206, and a transmitter 1222 that transmits to the one or more mobile devices 1204 through a plurality of transmit antennas 1208. Receiver 1210 can receive information from receive antennas 1206 and is operatively associated with a demodulator 1212 that demodulates received information. Demodulated symbols are analyzed by a processor 1214 that can be similar to the processor described above with regard to FIG. 11, and which is coupled to a memory 1216 that stores information related to estimating a signal (e.g., pilot) strength and/or interference strength, data to be transmitted to or received from mobile device(s) 1204 (or a disparate base station (not shown)), and/or any other suitable information related to performing the various actions and functions set forth herein.

Processor 1214 is further coupled to a constituter 1218 and/or a manager 1220. The constituter 1218 can establish a traffic plane function through with a network entity. The manager 1220 can performs QoS configuration with the network entity through use of the traffic plane function. Although depicted as being separate from the processor 1214, it is to be appreciated that constituter 1218 and/or manager 1220 can be part of processor 1214 or a number of processors (not shown).

Figure 13:
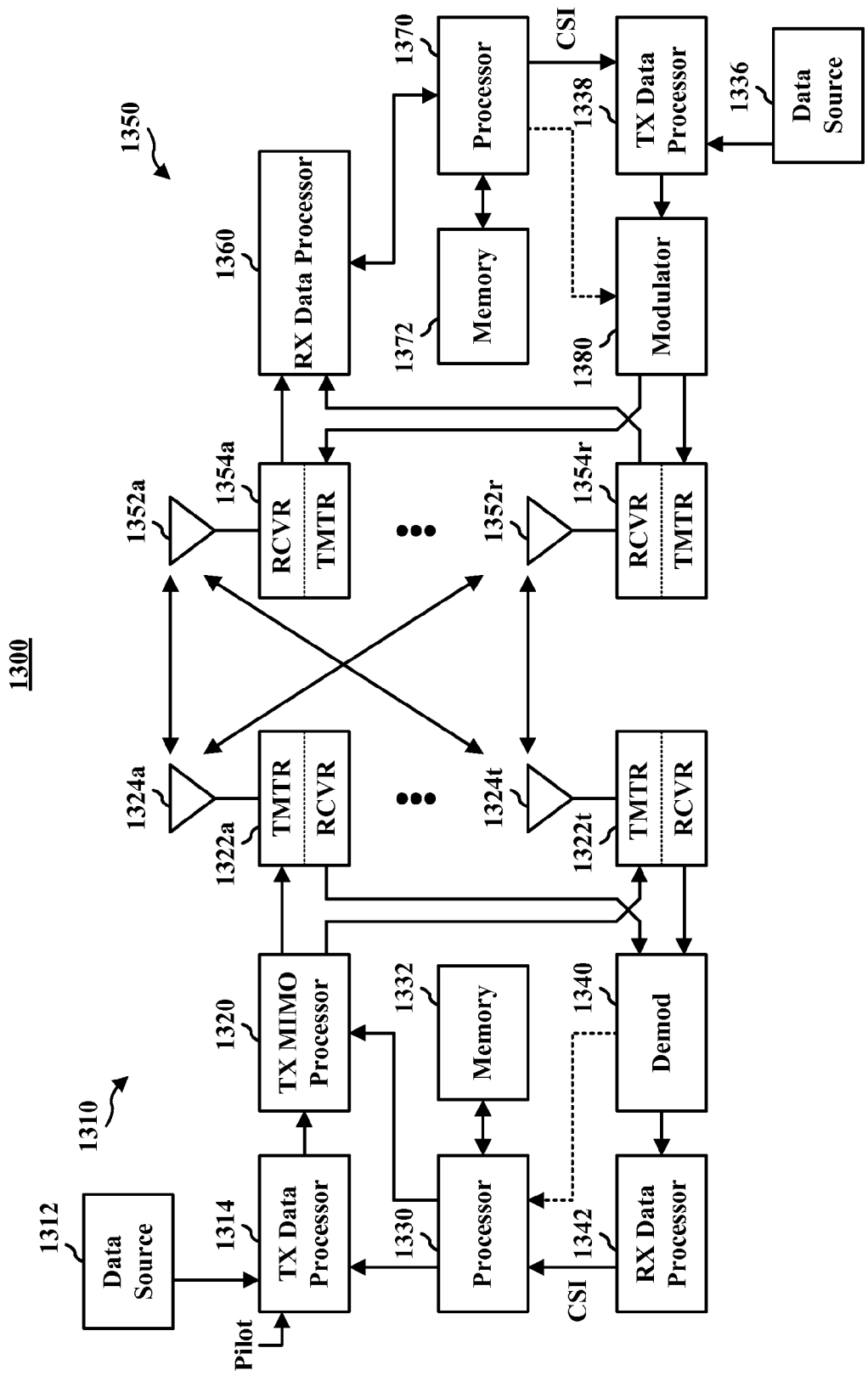
FIG. 13 is an illustration of an example wireless network environment that can be employed that is network configuration initiated in conjunction with the various systems and methods described herein.

FIG. 13 shows an example wireless communication system 1300. The wireless communication system 1300 depicts one base station 1310 and one mobile device 1350 for sake of brevity. However, it is to be appreciated that system 1300 can include more than one base station and/or more than one mobile device, wherein additional base stations and/or mobile devices can be substantially similar or different from example base station 1310 and mobile device 1350 described below. In addition, it is to be appreciated that base station 1310 and/or mobile device 1350 can employ the systems (FIGS. 1-6 and 11-12) and/or methods (FIGS. 7-10) described herein to facilitate wireless communication there between.

At base station 1310, traffic data for a number of data streams is provided from a data source 1312 to a transmit (TX) data processor 1314. According to an example, each data stream can be transmitted over a respective antenna. TX data processor 1314 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1350 to estimate channel response. The multiplexed pilot and coded data for each data stream can be modulated (e.g. symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1330.

The modulation symbols for the data streams can be provided to a TX MIMO processor 1320, which can further process the modulation symbols (e.g., for OFDM). TX MIMO processor 1320 then provides $N_T$ modulation symbol streams to $N_T$ transmitters (TMTR) 1322*a* through 1322*t*. In various embodiments, TX MIMO processor 1320 applies beamforming weights to the symbols of the data streams and to the antenna from which the symbol is being transmitted.

Each transmitter 1322 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 1322*a* through 1322*t* are transmitted from $N_T$ antennas 1324*a* through 1324*t*, respectively.

At mobile device 1350, the transmitted modulated signals are received by $N_R$ antennas 1352*a* through 1352*r* and the received signal from each antenna 1352 is provided to a respective receiver (RCVR) 1354*a* through 1354*r*. Each receiver 1354 conditions (e.g., filters, amplifies, and downconverts) a respective signal, digitizes the conditioned signal to provide samples, and further processes the samples to provide a corresponding "received" symbol stream.

An RX data processor 1360 can receive and process the $N_R$ received symbol streams from $N_R$ receivers 1354 based on a particular receiver processing technique to provide $N_T$ "detected" symbol streams. RX data processor 1360 can demodulate, deinterleave, and decode each detected symbol stream to recover the traffic data for the data stream. The processing by RX data processor 1360 is complementary to that performed by TX MIMO processor 1320 and TX data processor 1314 at base station 1310.

A processor 1370 can periodically determine which precoding matrix to utilize as discussed above. Further, processor 1370 can formulate a reverse link message comprising a matrix index portion and a rank value portion.

The reverse link message can comprise various types of information regarding the communication link and/or the received data stream. The reverse link message can be processed by a TX data processor 1338, which also receives traffic data for a number of data streams from a data source 1336, modulated by a modulator 1380, conditioned by transmitters 1354*a* through 1354*r*, and transmitted back to base station 1310.

At base station 1310, the modulated signals from mobile device 1350 are received by antennas 1324, conditioned by receivers 1322, demodulated by a demodulator 1340, and processed by a RX data processor 1342 to extract the reverse link message transmitted by mobile device 1350. Further, processor 1330 can process the extracted message to determine which precoding matrix to use for determining the beamforming weights.

Processors 1330 and 1370 can direct (e.g., control, coordinate, manage, etc.) operation at base station 1310 and mobile device 1350, respectively. Respective processors 1330 and 1370 can be associated with memory 1332 and 1372 that store program codes and data. Processors 1330 and 1370 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 14:
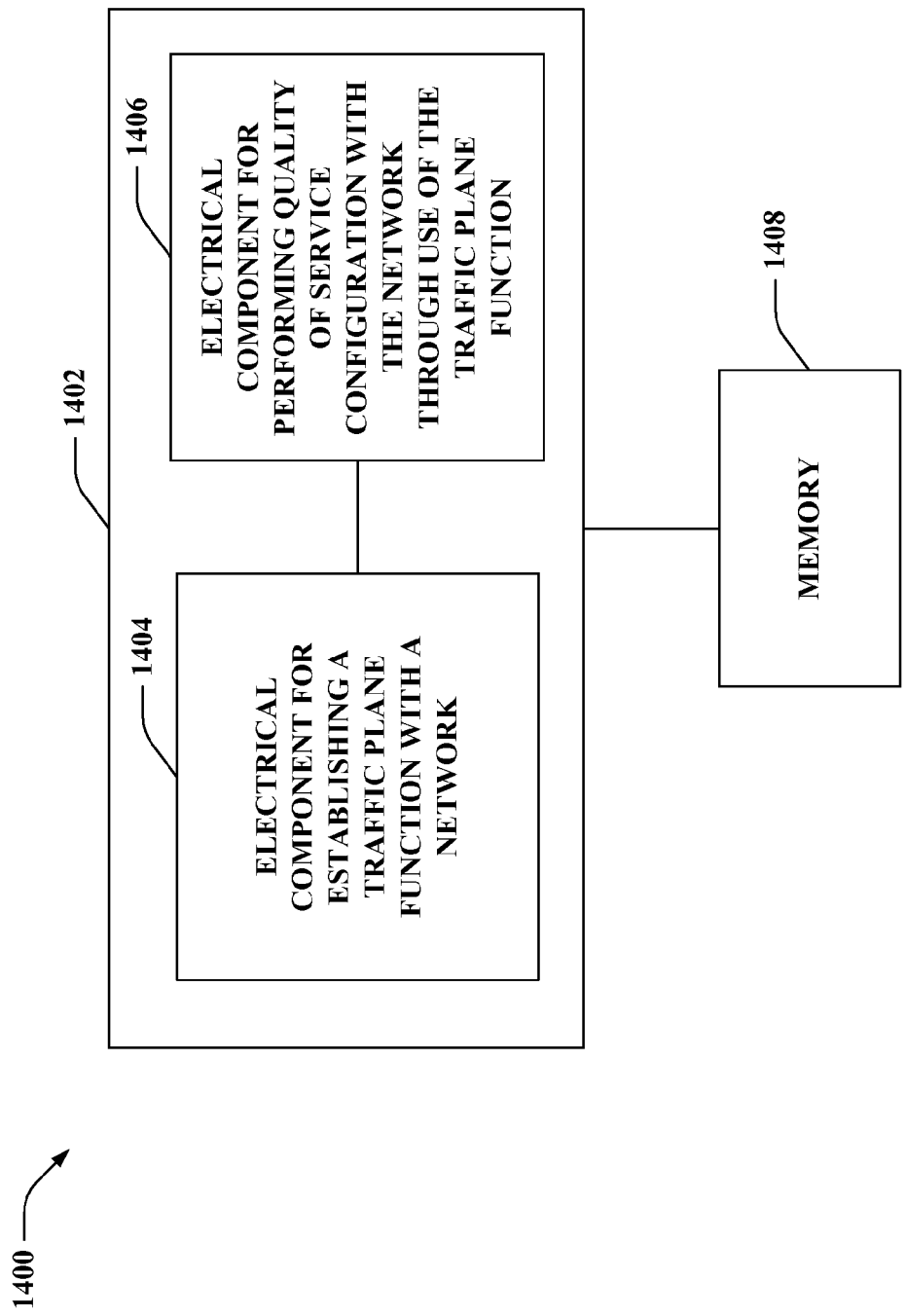
FIG. 14 is an illustration of an example system that facilitates use of quality of service information that is network entity initiated in accordance with various aspects set forth herein.

With reference to FIG. 14, illustrated is a system 1400 that effectuates use of QoS information in wireless communication. For example, system 1400 can reside at least partially within a mobile device. It is to be appreciated that system 1400 is represented as including functional blocks, which can be functional blocks that represent functions implemented by a processor, software, or combination thereof (e.g., firmware). System 1400 includes a logical grouping

1402 of electrical components that can act in conjunction. For instance, logical grouping 1402 can include an electrical component for establishing a traffic plane function with a network 1404. Moreover, the logical grouping 1402 can include an electrical component for performing quality of service configuration with the network through use of the traffic plane function 1406.

The logical grouping 1402 can also include an electrical component for reserving quality of service information prior to initiation of a communication link, the reserved quality of service information is configured, an electrical component for using update procedure to synchronize at least one policy between the network entity and the network, where configuring the traffic plane function can be done through use of subscription policy, policy update, and late binding, and/or an electrical component for supplying a permanent identity of the network entity to the network; these components can integrate as part of the electrical component for identifying a transmission of a control protocol data unit 1404 and/or the electrical component for incrementing a counter as a direct correlation of the identified transmission for the control protocol data unit 1406, as independent entities, and the like. Additionally, system 1400 can include a memory 1408 that retains instructions for executing functions associated with electrical components 1404 and 1406. While shown as being external to memory 1408, it is to be understood that one or more of electrical components 1404 and 1406 can exist within memory 1408.

Figure 15:
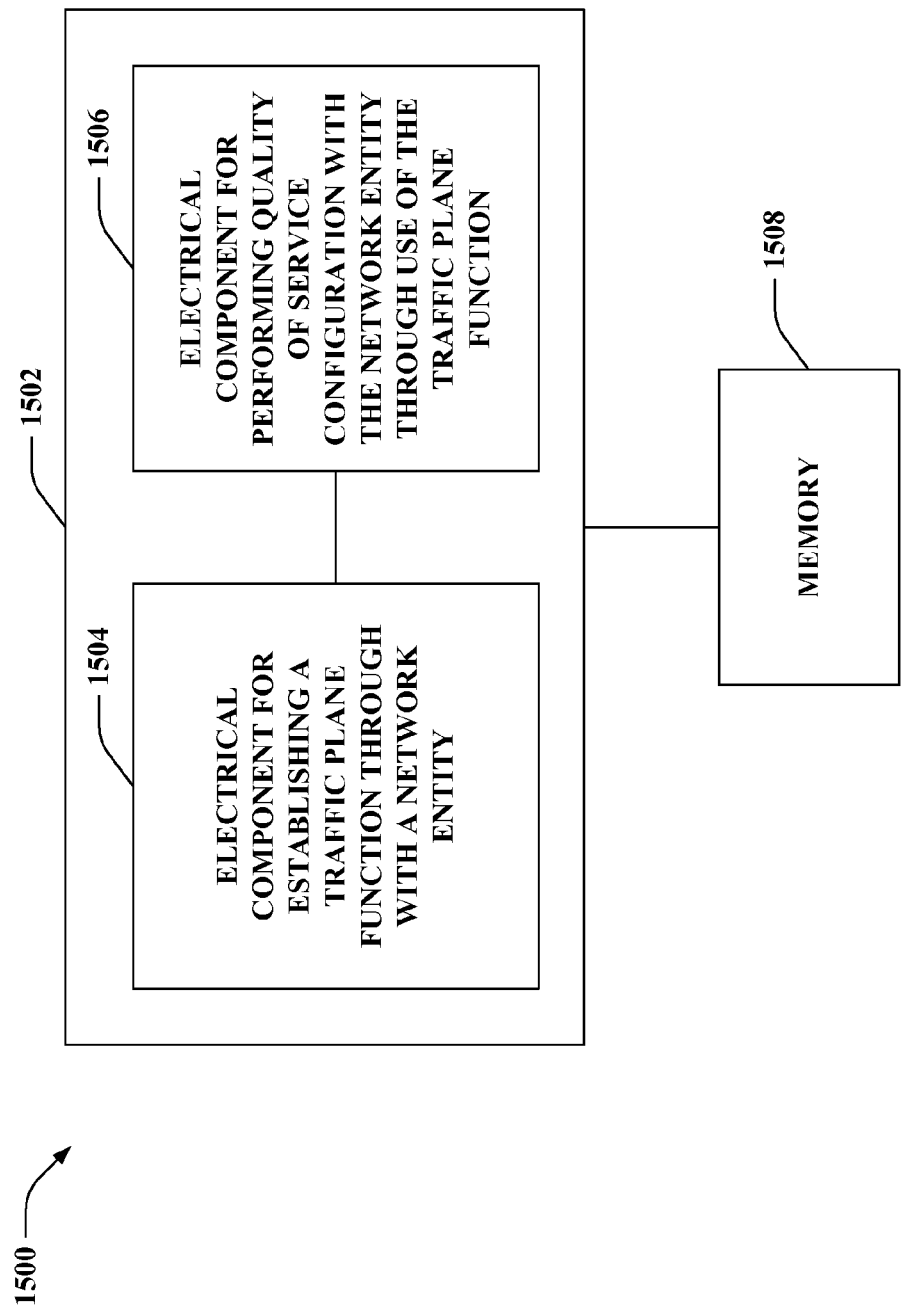
FIG. 15 is an illustration of an example system that facilitates use of quality of service information that is network configuration initiated in accordance with various aspects set forth herein.

Turning to FIG. 15, illustrated is a system 1500 that effectuates use of QoS information in wireless communication. For example, system 1500 can reside at least partially within a mobile device. It is to be appreciated that system 1500 is represented as including functional blocks, which can be functional blocks that represent functions implemented by a processor, software, or combination thereof (e.g., firmware). System 1500 includes a logical grouping 1502 of electrical components that can act in conjunction. For instance, logical grouping 1502 can include an electrical component for establishing a traffic plane function through with a network entity 1504. Moreover, the logical grouping 1502 can include an electrical component for performing quality of service configuration with the network entity through use of the traffic plane function 1506.

The logical grouping 1502 can also include an electrical component for collecting quality of service information from an access gateway, where the access gateway can obtain the quality of service information from a policy changing rules function, an electrical component for reserving quality of service information prior to initiation of a communication link, the reserved quality of service information can be configured, an electrical component for reserving a section of quality of service information; commonly the network entity uses a portion of the section of quality of service information, and/or an electrical component for using update procedure to synchronize at least one policy between the network entity and the network; these components can integrate as part of the electrical component for authenticating a control protocol data unit 1504 and/or the electrical component for producing a notice for a module that sends the control protocol data unit to reset a counter upon successful authentication of the control protocol data unit 1506, as independent entities, and the like. While shown as being external to memory 1508, it is to be understood that electrical components 1504 and 1506 can exist within memory 1510.

In addition, other relevant QoS characteristics can be implemented in accordance with aspects disclosed herein. It is to be appreciated the following is used for explanatory purposes and is in no way intended to limit scope. Systems can allow QoS differentiated IP services (such as VoIP and other data services) to bedefined and specified independently within the confines of the air interface. UMB air interface can support multiple IP flows. Each IP flow can be mapped onto a single reservation identified by a ReservationLabel, which in turn can be mapped to a stream.

eBS can transfer data with a access gateway via a PMIP GRE tunnel. The eBS creates a per-AT GRE tunnel to transport data frames between the AT and the AGW. A given packet data session can support one or more IP addresses. A PMIP GRE tunnel can carry multiple IP flows. An IP flow can be a series of packets that share a specific instantiation of IETF protocol layers. For example, an RTP flow can consist of the packets of an IP protocol instantiation, all of which can share the same source and destination IP addresses and UDP port numbers.

There can be QoS architecture in a CAN system. On the forward link, the AGW can copy DSCP of inner IP header to DSCP of outer IP header with consideration of DSCP marking authorization received from HAAA. Upon receiving IP Flows from AGW, the eBS can use packet filters received from AT to map forward traffic to the corresponding the air reservations which have different over the air QoS treatment.

For reverse link, the eBS can mark DSCP of both inner and outer IP headers based on over-the-air QoS (e.g., QoS FlowProfileID). When the AT and AGW performs access authentication and authorization with the Home AAA server, if the MS is authenticated, the Home AAA server can return Subscriber QoS.

Profile information via the Visited AAA Server to the AGW. A Subscriber QoS Profile consists of the following 3GPP2 attributes: The Maximum Authorized Aggregate Bandwidth for Best-Effort Traffic, The Authorized Flow Profile IDS for each direction, The Maximum per Flow Priority, The Inter-User Priority (e.g., best effort, QoS traffic, etc.), The Mapping between Flow Profile ID and DSCP, The Mapping between Flow Profile ID and policing rules (e.g., Token Bucket Parameters), The Allowed Differentiated Services Code Point (DSCP) Markings for Forward Link and Reverse Link, etc.

The Allowed Differentiated Services Code Point (DSCP) Markings for MIPv4 Reverse Tunneling can be used. If the AGW (access gateway, such as access gateway as 310 of FIG. 3) receives the Subscriber QoS Profile from the Home AAA server, it can provide QoS attributes (if available) except sometimes for an Allowed Differentiated Services Code Point (DSCP) Markings for MIPv4 Reverse Tunneling from the received Subscriber QoS Profile to the SRNC for QoS request authorization and traffic policing purposes.

The AGW can store the Allowed Differentiated Services Code Point (DSCP) Markings for Forward Link and Reverse Link attribute and an Allowed Differentiated Services Code Point (DSCP) Markings attribute for MIPv4 Reverse Tunneling for subsequent use. In the event of multiple NAIs per AT (e.g., access terminal), the AGW can receive a Subscriber QoS Profile for each NAI. The AGW can send the corresponding Subscriber QoS Profile to SRNC so that the SRNC handles multiple Subscriber QoS Profiles per AT.

The AGW can send a local subscriber QoS profile settings to the SRNC whenever the subscriber QoS profile is not included in the AAA message. Each AT's QoS Profile can contain Maximum Authorized Aggregate Bandwidth for Best-Effort Traffic. If the AGW receives the Maximum Authorized Aggregate Bandwidth for Best-Effort Traffic attribute from the AAA, it can send it to the SRNC through EAP Access Authentication and Authorization (AAA) procedures. The AN (network, such as the network 304 of FIG. 3) can use this parameter for admission control and radio resource management. The authorized Flow Profile IDS for each direction include the AT's authorized list of Flow Profile IDS for forward directions and reverse direction. AT's authorized list of Flow.

IDS can be different between the forward and reverse direction. QoS parameters requested by AT can contain a set of Flow Profile IDS for forward direction and reverse direction. If the AGW receives the Authorized Flow Profile ID attribute from the AAA, it can send it to the SRNC through EAP Access Authentication and Authorization procedures. The AN can enforce the set of authorized profiles by not granting Profile IDS that do not appear in the Authorized Flow Profile ID list.

Each AT's QoS Profile can contain Maximum per Flow Priority. If the AGW receives the Maximum per Flow Priority attribute from the AAA, it can send it to the SRNC through EAP Access Authentication and Authorization procedures. Applications in the AT can request a flow priority for a particular flow in QoS areas. The AN can grant about one of about sixteen possible priority levels, but commonly not greater than the Authorized Maximum per Flow Priority parameter in a Subscriber's QoS profile. This priority value can be used by the AN for admission control and resource allocation for the flow. Priority values received from Applications that are greater than the Authorized Maximum per Flow Priority can be reduced to a maximum value. Flows associated with higher priority values can gain service admission in preference to flows associated with lower priority values. Resource allocation preference can also be given to flows with higher priority values.

Each AT's QoS Profile can contain an Inter-User priority value. If the AGW receives the Inter-User Priority value AAA and can send it to the SRNC through EAP Access Authentication and Authorization procedures. The AN can use the Inter-User priority value for scheduling packets on the best Network Operators can choose not to use this capability by assigning all users a same parameter value.

Each AT's QoS Profile can contain the mapping between Flow Profile ID and DSCP. If the AGW receives the mapping between Flow Profile ID and DSCP attribute from the AAA, it can send it to the SRNC through EAP Access Authentication and Authorization procedures. The AN can use it for marking the reverse link packet based on granted Flow Profile ID.

Each AT's QoS Profile can contain the mapping between Flow Profile ID and policing rules. If the AGW receives the mapping between Flow Profile ID and policing rules attribute Gom the AAA, it can send it to the SRNC through EAP Access Authentication and Authorization procedures. The AN uses it for policing the forward packets based on granted Flow Profile ID. Policing rules include token bucket parameters such as peak rate, bucket size, token rate, maximum latency, etc.

Each AT's QoS Profile can contain the Allowed DSCP Marking on forward and reverse link. If the AGW receives Allowed DSCP Marking on reverse link attribute from the AAA, it can send it to the SRNC through EAP Access Authentication and Authorization procedures. In accordance with differentiated services standards, the AT can mark packets (e.g., in the reverse direction). The AN, however, can remark the differentiated services markings that the AT applies to packets based on granted QoS, Mapping between Flow Profile ID and DSCP, Allowed DSCP Marking on reverse link, and its local policy. The AGW can limit the differentiated services markings on the forward link packets based on Allowed DSCP Marking on forward link or based on its local policy.

According to one embodiment, there can be code points defines, whose lower about three bits (e.g., 3, 4, and 5) are all zero. Therefore, there can be about eight such classes. Default Forwarding (often called Best Effort) is a class selector with class equal to 0. Assured Forwarding (AF) classes and Expedited Forwarding (EF) Classes can be used. The attribute can contain three bits, the 'A', 'El, and '0' bits. When the 'A' bit is set, the packets can be marked with any AF class. When the 'E' bit is set, the packets can be marked with EF class. When the '0' bit is set, the packets can be marked with experimental/local use classes. The Max Class field can specify a maximum class for which a user or AGW can mark a packet.

Each AT'S QoS Profile can contain the Allowed DSCP Marking for MIPv4 Reverse Tunneling. If the AGW receives it, then the AGW can store it and use it if MIPv4 reverse tunneling is enabled. The Differentiated Services Code Points (DSCPs) supported in this document can be based on the following RFCs:

The attribute contains the aforementioned about three bits, the 'A', 'El, and '0' bits. When the 'A' bit is set, the packets can be marked with any AF class. When the 'E' bit is set, the packets can be marked with EF class. When the '0' bit is set, the packets can be marked with experimental/local use classes. The Max Class field specifies the maximum class for which AGW can mark a packet on the FA-HA reverse tunneling. For example, if the Max Class is set to Selector Class 3, all selector classes up to and including Selection Class 3 are allowed. If the Max Class is set to AF12, AF12 and AF13 marking are allowed. When all three bits are clear, and when the Max Class is set to zero, the AGW can send MIPv4 reverse tunneling packets marked best effort. If the Home AAA server wants to update Subscriber QoS Profile for the AT (NAI) that has been authenticated, it can send Subscriber QoS Profile information via the Visited AAA Server to the AGW. If the AGW receives the Maximum Authorized Aggregate Bandwidth for Best-Effort Traffic, the Authorized Flow Profile IDS for each direction, the Maximum per Flow Priority, the Inter-User Priority, the Mapping between Flow Profile ID and DSCP, the Mapping between Flow Profile ID and policing rules, Allowed Differentiated Services Code Point (DSCP) Markings for Forward Link and Reverse Link attributes, the AGW can send them to DAP. The AGW can also override the stored Allowed Differentiated Services Code Point (DSCP) Markings for Forward Link and Reverse Link attribute with this newly received attribute. If the AGW receives the Allowed Differentiated Services Code Point (DSCP) Markings for MIPv4 Reverse Tunneling attribute, it can override the stored Allowed Differentiated Services Code Point (DSCP) Markings for MIPv4 Reverse Tunneling attribute with this newly received attribute. The QoS differentiation on backhaul between the AN and AGW is based on IETF DS architecture.

On the forward link, when the AGW receives packets from internet, the AGW can copy DSCP of inner IP header to DSCP of outer IP header with consideration of Allowed DSCP Marking for Forward Link parameter received from HAAA and local policy. On the reverse link, when the AGW receives packet from the eBS, the AGW can match the source address of such packets to a source address that is associated with an authenticated NAI. The AGW can remark the packet based on Allowed DSCP Marking for reverse Link parameter and local policy.

For forward link, upon receiving IP Flows from AGW, the eBS uses the packet filters received from AT to map forward traffic to the corresponding over the air reservations which have different over the air QoS treatment. For reverse link, upon receiving IP flows from AT, the eBS marks DSCP of both inner and outer IP headers based on over-the-air granted QoS (e.g. QoS FlowProfileID), QoS Profile (Mapping between Flow Profile ID and DSCP attribute and Allowed DSCP Marking on Reverse Link parameter) if it is received from AGW.

If MIPv4 reverse tunneling is enabled, the AGW can copy (e.g., re-mark) DSCP of inner IP header to DSCP of outer IP header for MIP reverse tunneled traffic based on Allowed DSCP Marking for MIPv4 Reverse Tunneling attribute received from the Home RADIUS server or based on its local policy.

For MIPv4 FA mode forward traffic to the AT, the HA can set the differentiated services field of the HA-FA tunnel to the differentiated services class of each received packet bound to the AT based on local policy. For MIPv6 forward traffic to the AT, the HA can set the differentiated services field of the HA-AT tunnel to the differentiated services class of each received packet bound to the AT based on local policy.

In addition, there can be other parameters: 1 GRE key per AT, For AT initiated QoS (e.g., The AT establishes TFT with AN and performs QoS configuration with AN, For AN Initiated QoS; The AGW received QoS info from PCRF and sends it to AN; the AN can establish TFT with AT and performs QoS configuration with AT; The AN authorizes QoS setup based on QoS subscription profile received, via Access Authentication and QoS session policy received from AGW, if any.

The AGW can pass QoS session policy and charging rules received from Ty to the AN via Ty' interface: Flow identifier (e.g., 5 tuple, sourceldestination IP addresslport, protocol, etc.). This can be used for both charging and QoS, Authorized QoS based on service QCI, GBR, MBR etc., Charging model, Volume based, Duration based, etc., Offline vs Online charging, Gating etc. The AN can perform packet filtering for OTA QoS treatment and the AN can report accounting record to AGW.

For OTA link, QoS can be achieved by different RLPs with different QoS For reverse link, eBS can mark DSCP of both setup. For downlink traffic, eBS inner and outer IP headers based on OTA performs packet filtering for OTA QoS granted QoS (e.g. Profile ID), DSCP and treatment based on TFT received Profile ID mapping, and Allowed DSCP from AGW or AT. The BS also can also mark marking etc.

DSCP of both inner and outer IP For forward link, AGW can copy DSCP of inner headers based on TFT and OTA QoS IP header to DSCP of outer IP header with (e.g. Profile ID) with consideration of consideration of DSCP marking authorization DSCP marking authorization.

QoS User Profile (and Static Policy) can be sent from HAAA to SRNC via successful authentication: The Maximum Authorized Aggregate Bandwidth for Best-Effort Traffic, The Authorized Flow Profile IDS for each direction, The Maximum per Flow Priority, The Allowed Differentiated Services Markings, The Inter-User Priority.

What has been described above includes examples of one or more embodiments. It is, of course, not possible to describe every conceivable combination of components or methodologies for purposes of describing the aforementioned embodiments, but one of ordinary skill in the art can recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for configuring quality of service (QoS) for a link between an access terminal and a network, comprising:
    providing, at the network, a reservation identification space for applications of the access terminal, wherein the reservation identification space is divided into at least two spaces and comprises:
        a first reservation identification space for QoS configurations based on access terminal-initiated QoS requests, and
        a second reservation identification space for QoS configurations based on network-initiated QoS requests;
    sending, from the network to the access terminal, an indication of a QoS configuration for each application of the access terminal, based on whether a QoS request was initiated by the access terminal or the network;
    establishing a traffic plane function with the access terminal;
    determining whether the QoS request was initiated by the access terminal or the network based on the indication;
    performing the QoS configuration with the access terminal for one of the applications of the access terminal through use of the traffic plane function and information included in the first reservation identification space in response to a determination that the QoS request was initiated by the access terminal; and
    reserving, at the network and in response to performing the QoS configuration, QoS information prior to initiation of a communication link.

2. The method of claim 1, further comprising:
    receiving, by a node in the network, the QoS request, the QoS request being an access terminal-initiated QoS request from the access terminal, the QoS request including configuration information;
    sending, by the node in the network to a policy decision entity, at least a portion of the configuration information for authorization of the QoS request; and
    receiving, by the node, an authorization decision and at least one policy enforcement rule associated with the authorization decision from the policy decision entity.

3. The method of claim 1, further comprising:
    receiving, by a node in the network from a home authentication, authorization, and accounting (HAAA) device, a QoS attribute related to the access terminal.

4. The method of claim 1, further comprising:
    matching, by a node in the network, at least one policy enforcement rule with the information included in the first reservation identification space.

5. The method of claim 1, further comprising:
    receiving a QoS reservation request from the access terminal, wherein the reservation of the resources associated with the QoS reservation is based on the QoS reservation request.

6. The method of claim 1, further comprising:
updating the QoS configuration for synchronizing at least one policy between the access terminal and the network.

7. The method of claim 1, further comprising:
receiving a permanent identity from the access terminal.

8. An apparatus for configuring quality of service (QoS) for a link between an access terminal and a network, comprising:
a memory configured to store instructions; and
a processor coupled to the memory and configured to execute the instructions to:
provide, at the network, a reservation identification space for applications of the access terminal, wherein the reservation identification space is divided into at least two spaces and comprises:
a first reservation identification space for QoS configurations based on access terminal-initiated QoS requests, and
a second reservation identification space for QoS configurations based on network-initiated QoS requests;
sending, from the network to the access terminal, an indication of a QoS configuration for each application of the access terminal, based on whether a QoS request was initiated by the access terminal or the network;
establish a traffic plane function with the access terminal;
determine whether the QoS request was initiated by the access terminal or the network based on the indication;
perform the QoS configuration with the access terminal for one of the applications of the access terminal through use of the traffic plane function and information included in the first reservation identification space in response to a determination that the QoS request was initiated by the access terminal; and
reserve, at the network and in response to performing the QoS configuration, QoS information prior to initiation of a communication link.

9. The apparatus of claim 8, wherein the processor is further configured to:
receive the QoS request, the QoS request being an access terminal-initiated QoS request from the access terminal, wherein the QoS request includes configuration information;
send, to a policy decision entity, at least a portion of the configuration information for authorization of the QoS request; and
receive an authorization decision and at least one policy enforcement rule associated with the authorization decision from the policy decision entity.

10. The apparatus of claim 8, wherein the processor is further configured to:
receive, a home authentication, authorization, and accounting (HAAA) device, a QoS attribute related to the access terminal.

11. The apparatus of claim 8, wherein the processor is further configured to:
match at least one policy enforcement rule with the information included in the first reservation identification space.

12. The apparatus of claim 8, wherein the processor is further configured to:
receive a QoS reservation request from the access terminal, wherein the reservation of the resources associated with the QoS reservation is based on the QoS reservation request.

13. The apparatus of claim 8, wherein the processor is further configured to:
update the QoS configuration for synchronizing at least one policy between the access terminal and the network.

14. The apparatus of claim 8, wherein the processor is further configured to:
receive a permanent identity from the access terminal.

15. An apparatus for configuring quality of service (QoS) for a link between an access terminal and a network, comprising:
means for providing, at the network, a reservation identification space for applications of the access terminal, wherein the reservation identification space is divided into at least two spaces and comprises:
a first reservation identification space for QoS configurations based on access terminal-initiated QoS requests, and
a second reservation identification space for QoS configurations based on network initiated QoS requests;
means for sending, from the network to the access terminal, an indication of a QoS configuration for each application of the access terminal, based on whether a QoS request was initiated by the access terminal or the network;
means for establishing a traffic plane function with the access terminal;
means for determining whether the QoS request was initiated by the access terminal or the network based on the indication;
means for performing the QoS configuration with the access terminal for one of the applications of the access terminal through use of the traffic plane function and information included in the first reservation identification space in response to a determination that the QoS request was initiated by the access terminal; and
means for reserving, at the network and in response to performing the QoS configuration, QoS information prior to initiation of a communication link.

16. The apparatus of claim 15, further comprising:
means for receiving, by a node in the network, the QoS request, the QoS request being an access terminal-initiated QoS request from the access terminal, the QoS request including configuration information;
means for sending, by the node in the network to a policy decision entity, at least a portion of the configuration information for authorization of the QoS request; and
means for receiving, by the node, an authorization decision and at least one policy enforcement rule associated with the authorization decision from the policy decision entity.

17. The apparatus of claim 15, further comprising:
means for receiving, by a node in the network from a home authentication, authorization, and accounting (HAAA) device, a QoS attribute related to the access terminal.

18. The apparatus of claim 15, further comprising:
means for matching, by a node in the network, at least one policy enforcement rule with the information included in the first reservation identification space.

19. The apparatus of claim 15, further comprising:
means for receiving a QoS reservation request from the access terminal, wherein the reservation of the resources associated with the QoS reservation is based on the QoS reservation request.

20. The apparatus of claim 15, further comprising:
means for updating the QoS configuration for synchronizing at least one policy between the access terminal and the network.

21. The apparatus of claim 15, further comprising:
means for receiving a permanent identity from the access terminal.

22. A non-transitory computer-readable medium storing computer-executable code implemented by a processor for configuring quality of service (QoS) for a link between an access terminal and a network, comprising:
    code for providing, at the network, a reservation identification space for applications of the access terminal, wherein the reservation identification space is divided into at least two spaces and comprises:
        a first reservation identification space for QoS configurations based on access terminal-initiated QoS requests, and
        a second reservation identification space for QoS configurations based on network initiated QoS requests;
    code for sending, from the network to the access terminal, an indication of a QoS configuration for each application of the access terminal, based on whether a QoS request was initiated by the access terminal or the network;
    code for establishing a traffic plane function with the access terminal;
    code for determining the QoS request was initiated by the access terminal or the network based on the indication;
    code for performing the QoS configuration with the access terminal for one of the applications of the access terminal through use of the traffic plane function and information included in the first reservation identification space in response to a determination that the QoS request was initiated by the access terminal; and
    code for reserving, at the network and in response to performing the QoS configuration, QoS information prior to initiation of a communication link.

23. The computer-readable medium of claim 22, further comprising:
    code for receiving, by a node in the network, the QoS request, the QoS request being an access terminal-initiated QoS request from the access terminal, the QoS request including configuration information;
    code for sending, by the node in the network to a policy decision entity, at least a portion of the configuration information for authorization of the QoS request; and
    code for receiving, by the node, an authorization decision and at least one policy enforcement rule associated with the authorization decision from the policy decision entity.

24. The computer-readable medium of claim 22, further comprising:
    code for receiving, by a node in the network from a home authentication, authorization, and accounting (HAAA) device, a QoS attribute related to the access terminal.

25. The computer-readable medium of claim 22, further comprising:
    code for matching, by a node in the network, at least one policy enforcement rule with the information included in the first reservation identification space.

26. The computer-readable medium of claim 22, further comprising:
    code for receiving a QoS reservation request from the access terminal, wherein the reservation of the resources associated with the QoS reservation is based on the QoS reservation request.

27. The computer-readable medium of claim 22, further comprising:
    code for updating the QoS configuration for synchronizing at least one policy between the access terminal and the network.

28. The computer-readable medium of claim 22, further comprising:
    code for receiving a permanent identity from the access terminal.

* * * * *